(12) United States Patent
Caggiano

(10) Patent No.: US 8,545,609 B2
(45) Date of Patent: *Oct. 1, 2013

(54) MICROWAVE REACTIVATION SYSTEM FOR STANDARD AND EXPLOSION-PROOF DEHUMIDIFICATION SYSTEM

(75) Inventor: Mario Caggiano, Montreal (CA)

(73) Assignee: 7142871 Canada Inc., Riviere-Des-Prairies, Montreal, Quebec (CA)

( * ) Notice: Subject to any disclaimer, the term of this patent is extended or adjusted under 35 U.S.C. 154(b) by 404 days.

This patent is subject to a terminal disclaimer.

(21) Appl. No.: 12/801,292

(22) Filed: Jun. 2, 2010

(65) Prior Publication Data

US 2011/0011260 A1 Jan. 20, 2011

Related U.S. Application Data

(60) Provisional application No. 61/268,004, filed on Jun. 8, 2009.

(51) Int. Cl.
*B01D 53/02* (2006.01)

(52) U.S. Cl.
USPC .............. 96/125; 96/143; 96/144; 96/146; 96/150; 95/113; 95/117; 95/123; 95/148

(58) Field of Classification Search
USPC .............. 95/113, 117, 123, 148; 96/125, 96/143, 144, 146, 150
See application file for complete search history.

(56) References Cited

U.S. PATENT DOCUMENTS

| | | | | |
|---|---|---|---|---|
| 3,844,737 A | * | 10/1974 | Macriss et al. | 95/93 |
| 4,134,743 A | * | 1/1979 | Macriss et al. | 95/113 |
| 4,948,392 A | * | 8/1990 | Rush | 95/113 |
| 5,659,974 A | * | 8/1997 | Graeff | 34/378 |
| 5,667,560 A | * | 9/1997 | Dunne | 95/113 |
| 6,029,462 A | * | 2/2000 | Denniston | 62/94 |
| 6,178,762 B1 | * | 1/2001 | Flax | 62/271 |
| 6,423,275 B1 | | 7/2002 | D'Souza | |
| 6,767,391 B2 | * | 7/2004 | Tanaka et al. | 96/115 |
| 6,858,824 B1 | | 2/2005 | Monteleone et al. | |
| 6,918,263 B2 | * | 7/2005 | Lee et al. | 62/271 |
| 7,037,358 B2 | * | 5/2006 | Babicki et al. | 95/96 |
| 7,097,925 B2 | * | 8/2006 | Keefer | 429/9 |

(Continued)

FOREIGN PATENT DOCUMENTS

CA 1092199 12/1980

OTHER PUBLICATIONS

International Search report dated Jun. 28, 2012.

*Primary Examiner* — Christopher P Jones
(74) *Attorney, Agent, or Firm* — Husch Blackwell LLP

(57) ABSTRACT

The Microwave System and method of reactivation is designed to provide an indirect, safe and energy efficient source of heat and temperature rise required in the reactivation section of the desiccant unit for the release into atmosphere of the water vapors which are accumulated in the desiccant rotor. This microwave reactivation system and method is based on heat transfer produced from a heated fluid which is pumped through a closed loop coil assembly. This closed loop coil assembly is located and runs through both the isolated heating chamber of the microwave section and the reactivation / regeneration section in the dehumidification system. The airstream passing through the reactivation intake section comes in contact with the coil assembly and is heated to the desired temperature prior to reaching the desiccant rotor.

8 Claims, 10 Drawing Sheets

(56) References Cited

U.S. PATENT DOCUMENTS

| | | | |
|---|---|---|---|
| 7,166,149 B2 * | 1/2007 | Dunne et al. | 95/113 |
| 7,308,798 B2 * | 12/2007 | Caggiano | 62/63 |
| 2006/0144226 A1 * | 7/2006 | Damrath et al. | 95/90 |
| 2006/0272174 A1 * | 12/2006 | Hartig | 34/475 |
| 2007/0056307 A1 * | 3/2007 | Caggiano | 62/271 |
| 2009/0071110 A1 * | 3/2009 | Gonze et al. | 55/282.3 |
| 2011/0056220 A1 * | 3/2011 | Caggiano | 62/94 |
| 2011/0296858 A1 * | 12/2011 | Caggiano | 62/94 |

* cited by examiner

MICROWAVE REACTIVATION SYSTEM FOR STANDARD AND EXPLOSION-PROOF DEHUMIDIFICATION SYSTEM

CROSS-REFERENCE TO RELATED APPLICATION

This non-provisional utility application claims priority over the provisional patent application No. U.S. 61/268,004
Title: Microwave Reactivation System for Standard and Explosion-Proof Dehumidification System
Filing Date; Jun. 8, 2009
Confirmation No.; 8793
This non-provisional utility application makes reference to a previously issued patent which I obtained as the inventor; Mario Caggiano
USPTO Patent No.; U.S. Pat. No. 7,308,798 B2
Title: Dehumidification System
Date of Patent: Dec. 18, 2007

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Dehumidification and the control of moisture/humidity are of extreme importance and of crucial interest in numerous industrial sectors, such as; offshore, onshore, marine and military. Several processes and techniques have been designed and developed to address this serious problem. Some of these HVAC (Heating Ventilation and Air-Conditioning) hybrid systems which perform humidity control within specific spaces, do so primarily by using temperature; heating and expanding the air's capability to absorb and retain moisture, thus lowering the relative humidity and then by cooling the air temperature below its dew point, condensing and extracting the moisture/water vapors. Conventional systems, such as the basic cooling systems are comprised of cooling coils, a condenser coil, ventilation fan and a compressor unit.

While these systems are widely used and may operate effectively in various conditions, their main function and design purpose is to climatise and provide heating and cooling of a specific area, with dehumidification as a byproduct result. These type systems are generally used in various sites and conventional as well as hazardous industrial location applications. The primary advantage of using these type systems is that they do not generate hot airstreams or operate within high temperatures which could potentially ignite or spark flammable vapors and or even volatile gases found within the ambient air.

These cooling systems are generally very efficient while operating in warmer humid climatic conditions mostly found in the southern hemisphere but are found to be inefficient and non-compatible when operating in colder, damp climatic conditions located in hazardous, volatile environments found in northern regions. The desiccant dehumidification system operates on a completely different premise, which is that of differential vapor pressures and water vapor depression. The greater the dampness and humidity in the air, the greater the water vapor concentration and pressure.

In comparison, a dry desiccant rotor found in a desiccant based dehumidification system has a very low water vapor pressure. When damp humid high vapor pressure air molecules come in contact with the desiccant rotor's surface low vapor pressure, the molecules move from high to low in an attempt to achieve equilibrium. As the wet damp airstream passes through the rotor, the molecules are retained by the desiccant material and the resulting discharge air is delivered dry. Given that the desiccant dehumidification system does not utilize liquid condensate or gases, it allows this system the capability to effectively continue to operate and remove water vapors/moisture even when the dew point air temperature drops below freezing. Therefore, the desiccant dehumidification performance actually improves in colder temperatures and is not affected by the same deficiencies/drawbacks usually found in conventional cooling-based and or hybrid systems which utilize combinations of heating and cooling stages during operation.

The desiccant dehumidification systems are equipped with a desiccant rotor which is pierced and impregnated with a desiccant type material. The system includes two operational yet segregated sections; a process section and a reactivation section. During regular operation, an ambient airstream flows through the process section and subsequently the desiccant rotor, where the moisture is collected and removed from the airstream. The resultant is dry air discharge which is then delivered into the area or enclosure to be dehumidified. Simultaneously, another airstream passes through the desiccant dehumidifier and flows in the opposite direction through the segregated reactivation section and subsequently through the rotor's desiccant material. This air stream passing through the reactivation section is heated approximately 200 to 250 degrees F., prior to coming in contact with the rotors' surface. Heat has the effect of deactivating the desiccant material in the rotor, which in turn allows the material to release the water vapor molecules into the discharge airstream and to the outside atmosphere.

During the operating process, the desiccant rotor rotates slowly (approx. 8-10 rotations per minute) about its longitudinal axis. It has been established that desiccant dehumidification systems are highly effective in greatly reducing and controlling moisture and humidity in the air they are treating. Unfortunately, sometimes the energy required to operate such a system may be limited or not readily available, especially in the case of marine, offshore or remote mobile sites where these systems are required to operate.

This problem is caused by the fact that a high (heat) temperature rise in the airflow is absolutely required in the reactivation section in order to dry out the rotor desiccant material which usually translates into high energy requirements. The generating of heat is generally accomplished with the use of but not limited to the following systems; electric heating banks or elements, flame gas burners or submersible heater immersed in a fluid running through coils located in the airflow pathway that act in a way to radiate and transfer heat onto the reactivation airflow.

These methods are generally the most commonly used means to heat the desiccant dehumidification reactivation inlet airflow, so that the air temperature rises to a degree set point, before coming in contact with the rotor desiccant material. On the other hand, in the case of a typical mechanical dehumidification system where heating and or cooling processes are utilized separately or in combination such as a hybrid system, the role of the heating element is to generate heat to expand and raise the temperature of the air volume lowering the relative humidity. This airflow then goes through the refrigerant coils which rapidly cool down the airflow temperature enabling the extraction of moisture as condensate. This new "Microwave Reactivation System" is designed and intended to be installed in standard and explosion-proof dehumidification systems for operation as a high heat generating source. In the preferred embodiment, this microwave reactivation system is installed in the reactivation section of either a standard or explosion-proof desiccant dehumidification system.

This microwave reactivation system produces heat by generating electromagnetic waves which passes through materials and fluids, causing the molecules within to rapidly oscillate in excitation and in turn generating heat.

In the preferred embodiment, the medium used to store and transmit this heat is a fluid. This fluid is moved by means of supply and return pumps, flowing through a first parallel series of glass ceramic coils which is part of a closed-loop circuit, passing through the microwave heating chamber where the fluid molecules are treated and exposed to electromagnetic waves causing excitation and generating high heat. This super heated fluid then flows through a second parallel series of metallic coils located in the lower reactivation section, in the direct path of the airflow. This heat transfer from the fluid to the coils substantially raises the temperature of the airflow as it comes in contact and passes across the surface of the coils. This heated airflow is then used to deactivate the perforated desiccant material which is impregnated within the desiccant wheel/rotor, as it passes through it. This heat laden airstream has a demagnetizing effect on the desiccant material enabling it to release the retained accumulated moisture and thus greatly lowering the vapor pressure in the desiccant material for reuse in the dehumidification process section. In an alternative embodiment, the microwave reactivation system can also be adopted and installed in any mechanical heating/cooling hybrid or refrigerant type dehumidification system that must generate a heat source in order to successfully accomplish the dehumidification process.

In the above types of dehumidification systems which are included but not limited to, a heat source is required in order to raise the intake ambient airflow temperature, expand air volume and then allow the refrigerant cooling coils to rapidly cool down the processed airflow as it passes through, so that the suspended moisture can be extracted through condensation.

Essentially, the microwave reactivation system can replace other conventional heat generating sources as previously mentioned but not limited to, such as; electric heating banks and elements, flame gas burner or submersible heating element immersed in a fluid which raises the temperature producing heat. The installation and operation of this microwave reactivation system will enable the capability to achieve the heat generating requirements which are essential for operational efficiency and optimum output of the mechanical hybrid, refrigerant and particularly the desiccant dehumidification type processes. Simultaneously, due to its highly effective ratio of low energy requirement versus high heat generating capabilities, the microwave reactivation heating system will substantially diminish the electrical power demand and consumption without compromising on performance. It is essential for these industrial dehumidification systems and in particular for the desiccant dehumidification system whether standard or explosion-proof rated, to develop proper Bill heat generation for optimum dehumidification and peak operational performance. The microwave reactivation heating system enables to safely and effectively achieve and surpass all of the above requirements.

BRIEF SUMMARY OF THE INVENTION

According to the broad aspect of an embodiment of the present invention, there is provided a Microwave Reactivation System which has the function of heat generation for the reactivation section of a desiccant type dehumidification system or a mechanical dehumidification system which combines both heating and cooling. The mechanical heating/cooling hybrid, refrigerant or desiccant dehumidification systems are used for the purpose of dehumidifying and drying materials and or an air volume within an enclosed area or space.

In the preferred embodiment, the Microwave Reactivation System is designed for use in the desiccant dehumidification type system. The desiccant dehumidification system is comprised of two operating sections; the process and the reactivation sections. The desiccant dehumidification system has a desiccant rotor/wheel assembly which is mounted and rotates within a cabinet made up of two separate isolated sections. The desiccant rotor/wheels' perforated core is impregnated with a desiccant type material which has the capability of capturing and retaining water vapors found in ambient air. The process section is intended as the collection and retention of the moisture/water vapors found in the ambient airflow. A blower located in the process section is provided to propel at high velocity this airflow through the rotor, where the desiccant material retains the moisture and the airflow which is discharged through the process outlet is delivered dry to the enclosure.

Simultaneously, another blower located in the reactivation section propels the airflow which passes through the reactivation section. This airflow comes in contact and is heated by a series of hollow serpentine coils which have an internal heated fluid which flows through it. The high heat radiated off the coils is transferred through the coils and onto the airflow substantially raising the temperature as it comes in contact with the rotor surface. As the hot airflow passes through the perforated rotor, this process deactivates the desiccant material enabling it to release the moisture into the airflow transporting the damp air through a discharge outlet to the ambient atmosphere.

This perpetual process allows the rotor's core desiccant material to release the moisture build-up as it rotates through the reactivation section and then rotating back into the process section where it resumes the removal of water vapor/moisture in the process airflow.

The Microwave Reactivation System is comprised of two separate sections working together. The microwave section is made up of an explosion-proof outer cabinet with an inner casing which includes a cavity with inner surfaces thereof forming a microwave heating chamber. A shielding plate forming a compartment located above the microwave heating chamber is to provide housing for the microwave power transformation components therein, such as; magnetron, high voltage transformer, diode, capacitor and other operational components.

In the preferred embodiment, the Microwave Reactivation System is comprised of two separate coil assemblies combined as part of a single closed-loop system. They are mounted and firmly secured in place by using a series of shock resistant mounting brackets. There is a glass-ceramic coil assembly which is mounted in the microwave heating chamber and linked at two points to a metallic coil assembly which is mounted in the reactivation section. These coil assemblies are firmly linked at two opposite points by means of fittings and seals which are securely connected to separate pumps, one for supply and the other for return. The pumps ensure a steady and continuous heater fluid flow from the microwave section to the reactivation section and back again. These pumps are oppositely located in a shielding plate forming a compartment in between the microwave heating chamber and the reactivation section. This closed-loop circuit passes through both the microwave heating chamber in the microwave section and the reactivation section of the dehumidification system. The hollow coil is constructed of one length and designed as a closed loop line, in which flows a heat transfer fluid, such as a; thermal oil or heater liquid, used to carry thermal energy. The fluid is continuously heated within the microwave section as it is pumped and circulates through the heating chamber and transferring the accumulated thermal energy/heat to the coils which radiate onto the airflow as it passes through the reactivation section. The fluid uninterrupted movement is ensured by the installation and operation of one or several explosion-proof pumps within the assembly. This ensures the circulation of the heated fluid from the heating chamber located in the microwave section onto the reactivation section and back again in a continuous process.

This Microwave Reactivation System therefore generates the heat source and airflow temperature rise which is required to properly deactivate the desiccant material found in the rotor core, so that it can release the accumulated moisture/water vapors into the airstream being discharged to the ambient atmosphere.

The enormous benefits of the Microwave Reactivation System is that it performs its primary function of providing a reactivation heat source, while greatly reducing the energy requirement for heat generation and overall power consumption of the desiccant dehumidification system. This important energy savings allow for the dehumidification systems to be more widely accessible and available in standard and critical hazardous applications which would have been previously unserviceable due to power supply limitations. The high energy requirements usually associated with the use of standard dehumidification units is eliminated with the adaption of this microwave reactivation system.

Present sources of heat generation utilized in reactivation sections such as; electric heating elements, account for the major share of operating energy of a desiccant or mechanical dehumidification system. Because of the greatly reduced electrical power requirements needed to operate the microwave reactivation system, it therefore allows the dehumidification technology to be operated at optimum performance in environments and applications found onshore, offshore, marine and military, where power availability may be limited and or utilized for other critical operational requirements.

The explosion-proof cabinet construction of the heating chamber part of the Microwave Reactivation System can be constructed and installed in an existing explosion-proof dehumidification system ref.: U.S. Pat. No. 7,308,798 B2, for use and operation in hazardous locations.

The Microwave Reactivation System can be also incorporated and adapted to standard non-explosion-proof dehumidification systems such as; desiccant units requiring heat for reactivation and HVAC units which use a combination of heating and cooling in the dehumidification process.

BRIEF DESCRIPTION OF THE SEVERAL VIEWS OF THE DRAWING

The embodiments of the present invention shall be more clearly understood by making reference to the following detailed description of the embodiments of the invention taken in conjunction with the following accompanying drawings which are described as follows.

DETAILED DESCRIPTION OF THE INVENTION

Figure 1:
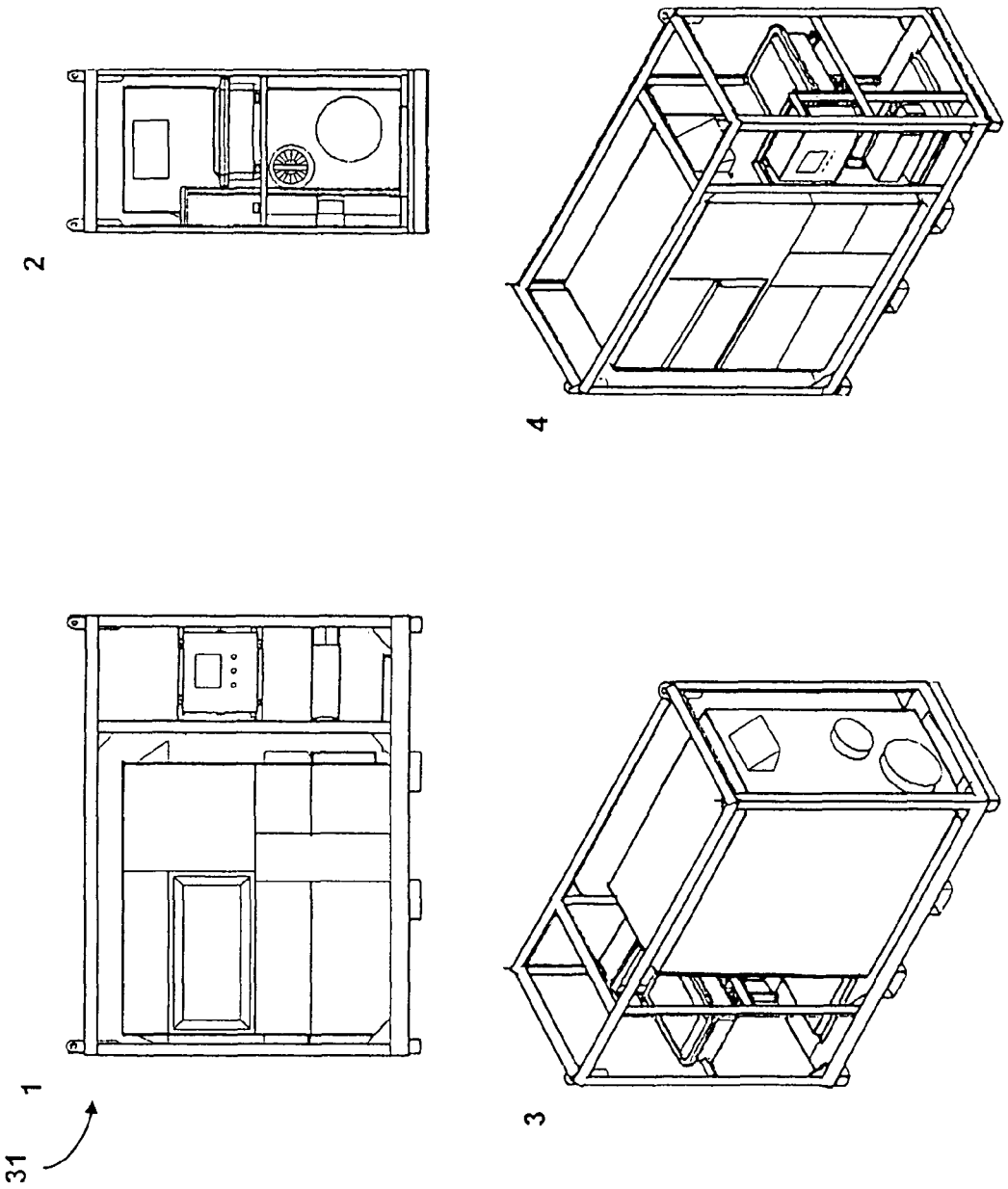
FIG. 1 is the schematic diagram elevation and prospective views of the dehumidification system according to the preferred embodiment of the invention. These corresponding views are enlarged and shown on FIGS. 3, 4, 5, 8, 9 and 10.

The description which follows and the embodiments described therein are provided by way if illustration of an example, or examples of particular embodiments of principles and aspects of the present invention. These examples are provided for the purpose of explanation and not of limitation, of those principles of the invention.

In the description that follows, like parts are marked throughout the specification and the drawings with the same respective reference numerals. With regards to the nomenclature, the term "explosion-proof" as it is used throughout the specification in connection with the Microwave Reactivation System FIGS. 3, 4, 5, 6, 7 herein and or any electrical components, parts or modules as part of the microwave reactivation system 33, means that the enclosure thereof is capable of withstanding the pressure of an explosion or of an explosive mixture exploding inside the enclosure without rupture and capable of preventing the propagation of an explosion inside the enclosure to the atmosphere surrounding the enclosure. Referring to FIGS. 3, 4, 5, 6 and 7, the Microwave Reactivation System as shown will be identified throughout the description by the numeral 33. Referring to FIGS. 1, 3, 4, 5, 8, 9 and 10, there is shown a dehumidification system identified throughout the description as numeral 31 and illustrated on FIG. 1 unit views 1, 2, 3 and 4.

As will be explained in greater detail below, that the dehumidification system 31 is operable to remove moisture/humidity from the air in a specific enclosed space (not shown). The dehumidification system 31 FIGS. 1, 3, 4, 5, 8, 9 and 10 can be installed inside or outside of an enclosed space and the dry air distributed by using duct work tubing. By using the microwave reactivation system 33 FIGS. 4, 5, 6, 7 in an explosion-proof designed casing 34 FIGS. 3 and 4 as part of an overall explosion-proof dehumidification system 31 which can be used near or within an enclosure located in a hazardous environment. A perfect example is a location identified as Class. 1—Division/Zone 2 as defined in the 2002 edition of the Canadian Electrical Code, Part 1, Section 18 entitled "Hazardous Locations", published by the CSA Canadian Standards Association, Toronto, Ontario; the disclosure of which is hereby incorporated for reference. In such a location, flammable gas or vapors may be present in the air in quantities sufficient to produce an explosive or ignitable mixture.

However, while this hazard does not normally exist, it may occur under abnormal conditions. Examples of such hazardous locations include offshore installations and drilling platforms, nuclear plants, petrochemical/chemical plants, oil refineries military live installations and armament storage facilities, etc. . . . As it will be explained below in greater detail, that an explosion-proof dehumidification system 31 FIGS. 1, 3, 4, 5, 8, 9 and 10 is designed with a microwave reactivation system 33 FIGS. 4, 5, 6, 7 in an explosion-proof casing 34 FIGS. 3 and 4 would be well-suited for a safe deployment in such hazardous and volatile locations.

Figure 3:
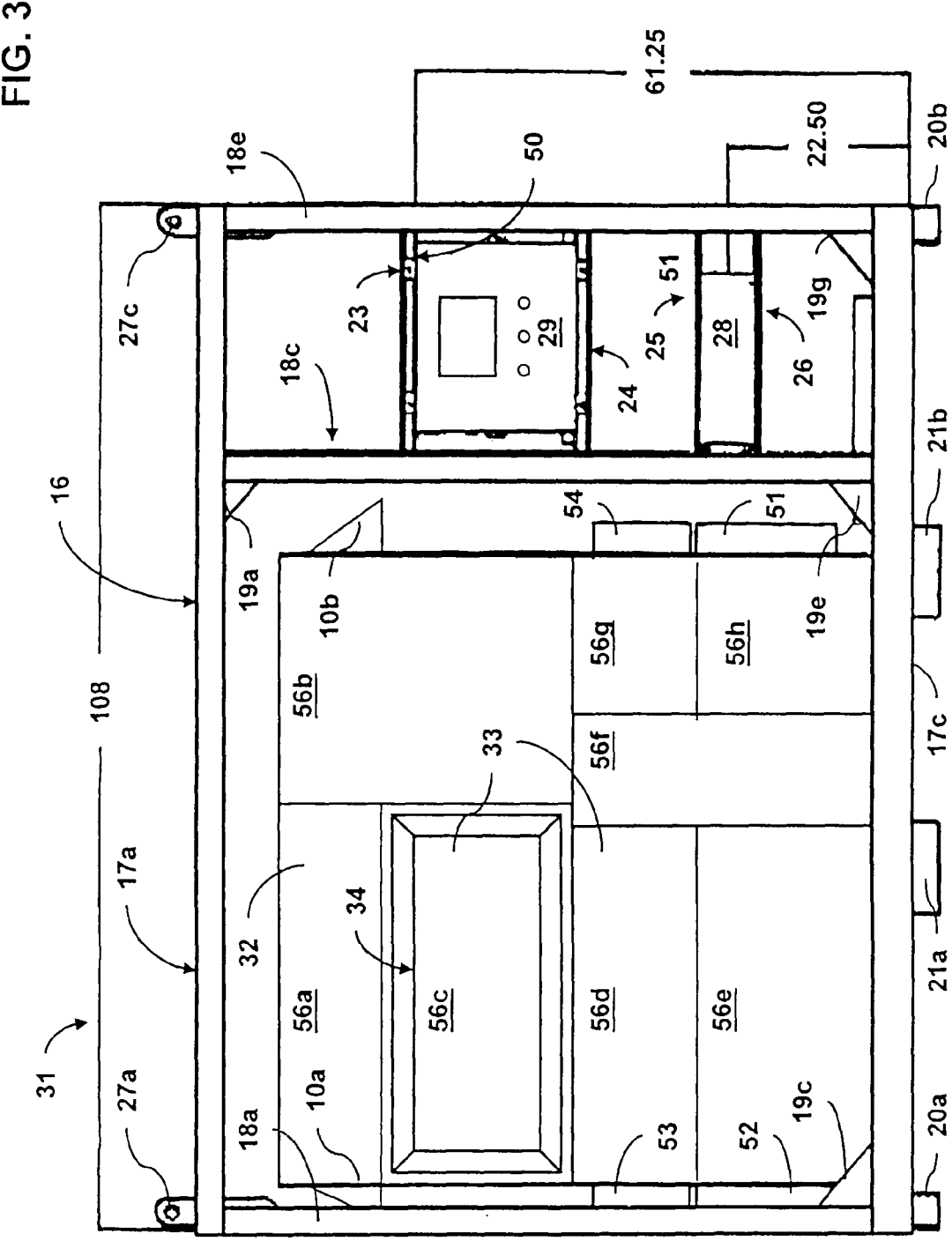
FIG. 3 is a schematic diagram elevation view of the dehumidification system shown also in unit view 1 FIG. 1.

The dehumidification system 31 unit views 1, 2, 3, 4, FIG. 1 is supported and mounted inside a rectangular box-like, rigid steel frame 16 FIG. 3. This frame 16 FIG. 3 is constructed from several structural members assembled from top to bottom as; longitudinal beams 17a, b, base longitudinal beams 17c, d FIG. 3, transversal beams 22a, b, c with 22d, e, supporting the electrical panel 30 and (PLC) programmable logistic controller panel 29. Vertical posts 18a, b, c, d, e, f FIG. 3 with 18g, h, supporting the PLC panel 29 and plug-in power cable connector panel 28 and diagonal brace members 19a, b, c, d, e, f, g, h, FIG. 3. There is also a u-shaped beam 23 comprised of a small longitudinal beam and two small transversal beams which surrounds and supports the PLC panel 29 and plug-in power cable connector panel 28 and attaches to the vertical posts 18c, e, providing support and sturdiness. There are three additional small longitudinal beams 24, 25, 26 located behind the PLC panel and plug-in power cable connector panel which are attached to the vertical posts 18g and 18h also providing support and sturdiness to this framework surrounding the control and electrical panels of the dehumidification system 31. The frame 16 FIG. 3 also includes two base feet 20a and 20b FIG. 3 located at both ends for positioning on a structural support surface as well as two sleeve channels 21a, b, FIG. 3 located in the base center for fork lifting and four corner lifting points 27a, b, c, d FIG. 3 located at the top corners of the frame, for inserting the hooks of a sling assembly to enable manipulation and displacement on a roof, floor or platform.

In the preferred embodiment, the dehumidification unit frame 16 is constructed of stainless steel and the cabinet/casing 34 is constructed of stainless steel or aluminum in order to prevent rust accumulation, corrosion and deterioration even when used in abrasive environments, such as offshore marine applications. In an alternate embodiment, an epoxy coated resistant steel frame 16 and cabinet 32 type construction may also be used.

Therefore, the dehumidification system 31 FIGS. 1, 3, 4, 5, 8, 9 and 10 is well supported by this frame structure 16 and benefits from enhanced and secured portability in all environments and locations. It can be transported and deployed with ease to various temporary or permanent work sites and facilities. As shown in FIGS. 1, 3, 4, 5, 8, 9 and 10 the frame 16 FIG. 3 is open to thereby facilitate and enable access to the overall dehumidification system 31 FIGS. 1 and 3 cabinet 32 FIGS. 1 and 3 in order to verify the components and perform routine maintenance and repairs. However it must be understood that in an alternative embodiment, the frame 16 could be constructed with an outer shell, panels or walls which would encapsulate and form a structural enclosure which would house the dehumidification system 31 FIGS. 1 and 3 as well as its operating components including the Microwave Reactivation System as described in 33 FIGS. 4, 5, 6 and 7. The construction of such an enclosed structure would definitely provide additional enhanced environmental protection for the dehumidification system 31 FIG. 1 and the microwave reactivation system 33 FIGS. 4, 5, 6 and 7.

The overall design can be explained in an exemplary application, where an explosion-proof dehumidification system 31 which is designed and equipped with the Microwave Reactivation System 33 FIGS. 4, 5, 6, 7 is encased in an explosion-proof housing 34 FIG. 3 that can be deployed on a work site which is categorized as a hazardous environment or location. On the other hand the same Microwave Reactivation System 33 FIGS. 4, 5, 6, 7 could be incorporated in a standard desiccant dehumidification or HVAC system as heat generating source, in order to greatly reduce power requirements and electrical consumption while enabling heat generation in these systems in order for them to perform efficiently. The control of negative effects such as corrosion and failures on materials, systems and components created by high humidity, moisture on work sites such as; offshore, marine, etc. . . . are of crucial and extreme importance. In addition, coupled with the hazardous locations and volatile environments which may potentially exist, adds a major concern for the coating, blasting and resurfacing work of metal surfaces to remove protective coatings thereby exposing the underlying metal surfaces to the ambient air. Maintenance procedures and work which must be performed on mechanical systems, electrical/electronic equipment and components are also seriously affected and compromised by these high humidity conditions. If the level of humidity in contact with these substances is left unchecked or uncontrolled, the exposed metal surfaces will corrode, deteriorate and or fail before the new protective coating can be applied. Mechanical systems, electrical equipment and electronic components are also at risk of corrosion, deterioration and operational failure if exposed to these same uncontrolled damp and humid conditions.

Deployment of the dehumidification system 31 FIGS. 1, 3, 4 on the work site will substantially reduce the moisture concentration within an enclosure or area and therefore, mitigate and greatly reduce the risk of corrosion, deterioration and subsequently system failure. In addition, by incorporating the Microwave Reactivation System 33 FIGS. 4, 5, 6 and 7 in the dehumidification system 31 FIGS. 1, 3, 4 this will enable to achieve important reductions in electrical power requirement and consumption without compromising and delivering optimum system performance. This highly important benefit acquired when using the Microwave Reactivation System 33 FIGS. 4, 5, 6 and 7 will enable the capacity to achieve substantial energy savings without compromising on the advantages of the dehumidification system and technology 31. The inclusion of the microwave reactivation system 33 into the dehumidification system 31 will enable highly effective dehumidification and the capability to operate in areas, applications and sites with limitations on energy and electrical power supply availability. Given the portability of the dehumidification system 31 FIGS. 1, 3, 4 which is designed and equipped with the Microwave Reactivation System 33 FIGS. 4, 5, 6 and 7 this allows for rapid movement to another application or work site within the facility once the various work projects such as corrosion maintenance or resurfacing and recoating have been completed. In reference to the construction, FIGS. 2, 4 demonstrate the components of the dehumidification system 31 FIGS. 1, 3, 4 which includes; a desiccant rotor or wheel assembly 5 FIGS. 2, 4 with a process section 35 FIGS. 2, 4, 5, 6, 7, 8, 9 and a microwave heating chamber 36 FIGS. 4, 5, 6, 7 as part of the reactivation or regeneration section 38 FIGS. 2, 4, 5, 6, 7 and 9.

Figure 2:
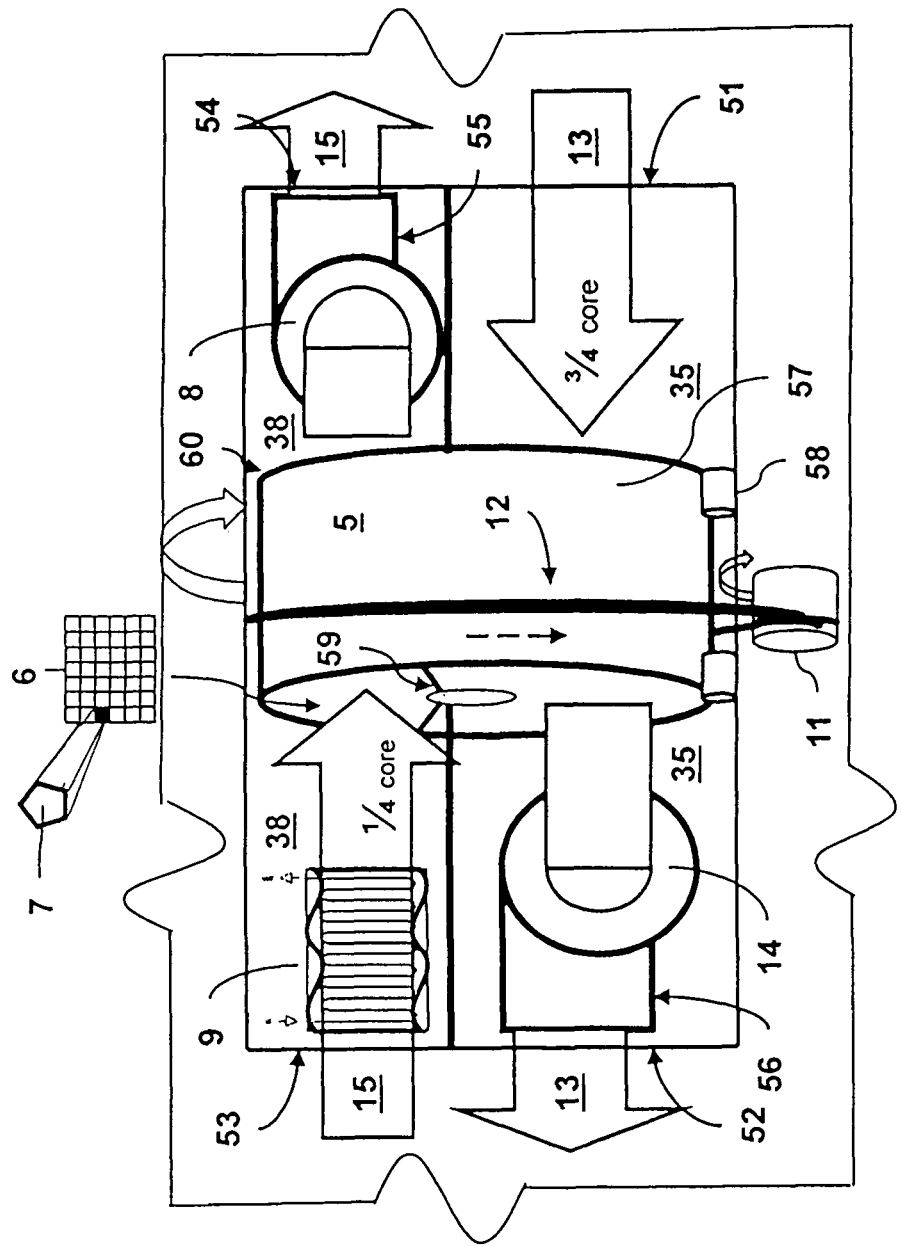
FIG. 2 is a schematic diagram sectional view of the desiccant rotor/wheel assembly depicting the typical air flow movement drawn by the suction blowers simultaneously across the microwave reactivation and process sections and through the desiccant rotor or wheel core material during operation of the dehumidification system along with the electric drive motor for driving and rotating the desiccant rotor/wheel assembly (not to scale)
Figure 4:
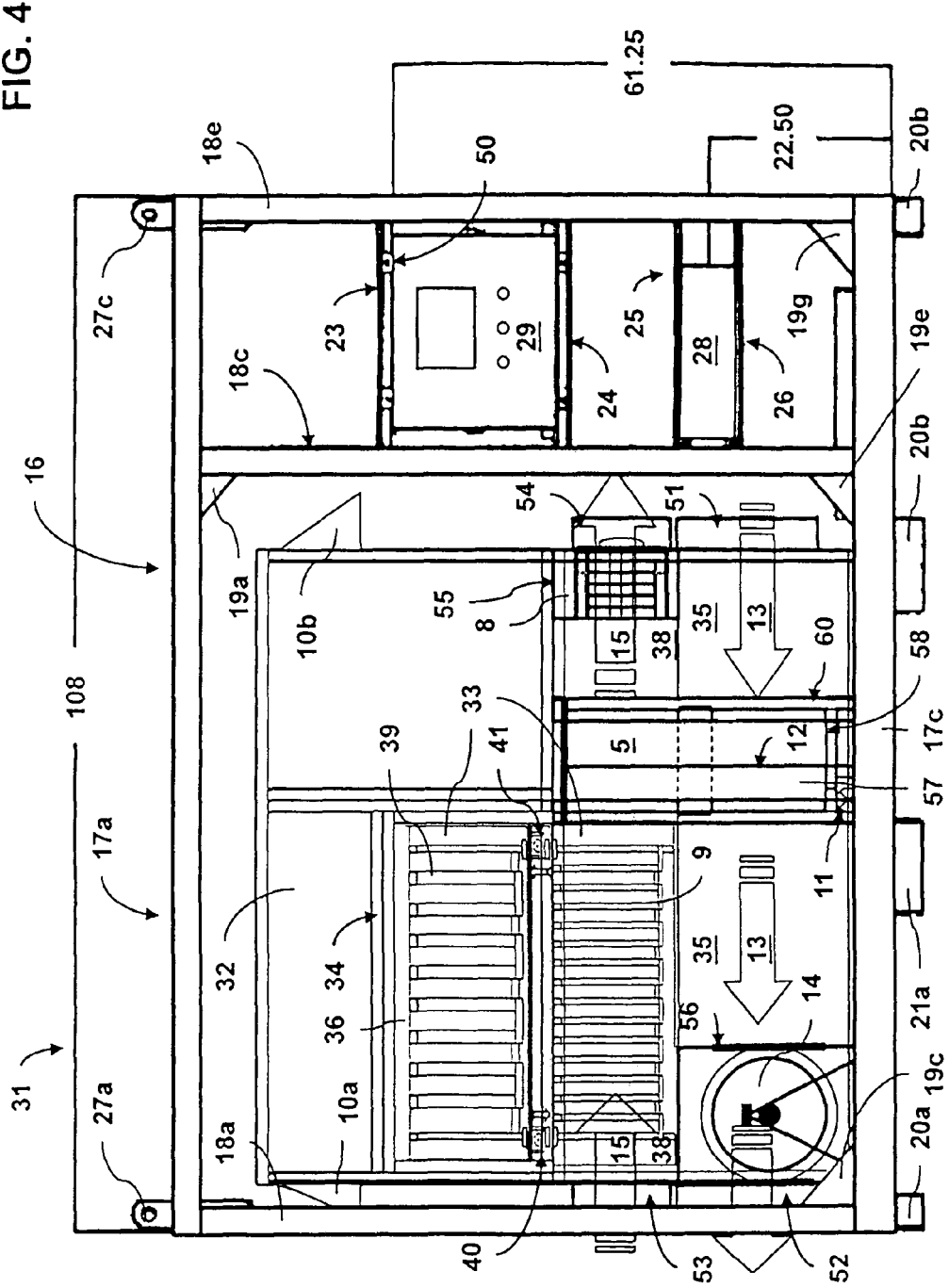
FIG. 4 is a schematic diagram which combines a full sectional and elevation view of the dehumidification system 31 shown also in FIGS. 1, 3 with the various dehumidification operational exposed sections; process section, microwave reactivation/regeneration section, microwave heating chamber also shown in FIGS. 6 and 7 (not to scale)
Figure 5:
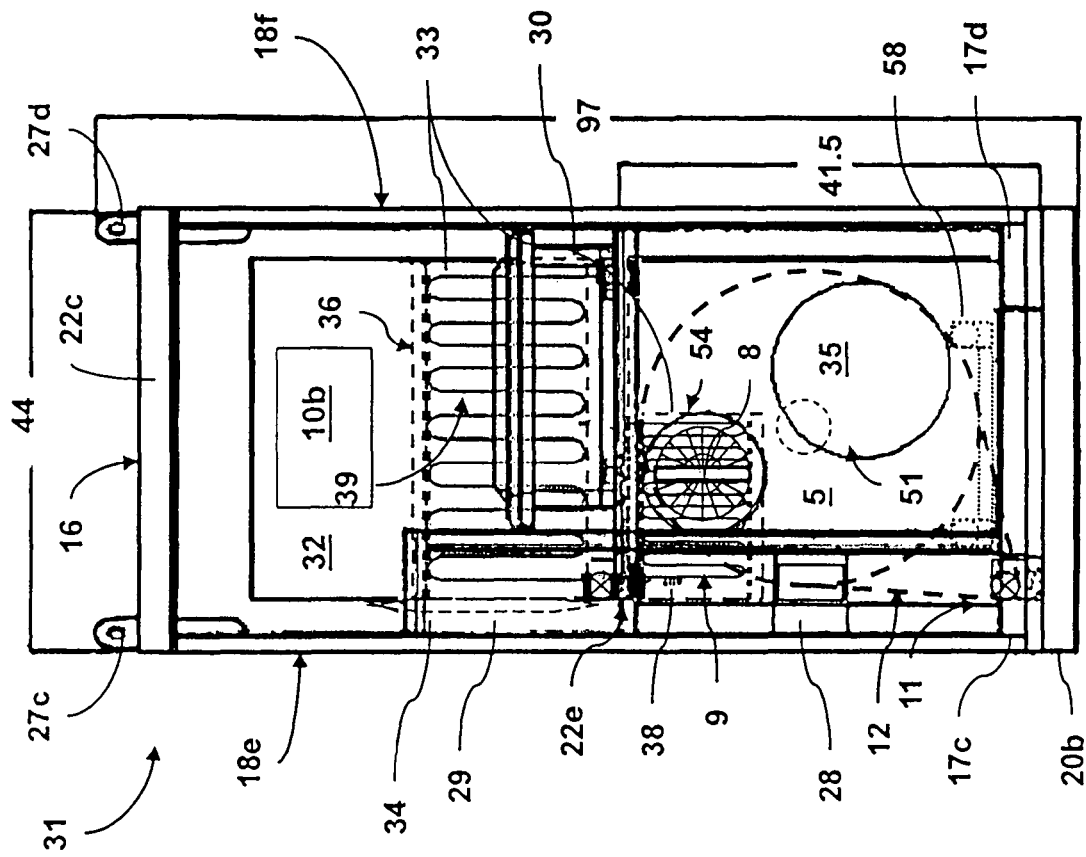
FIG. 5 is a schematic elevation end view of the dehumidification system shown also in unit view 2 FIG. 1 with the exposed closed-loop inter-linked coil assemblies shown also in FIGS. 4, 5, 6, 7 located jointly in the microwave heating chamber and the microwave reactivation/regeneration section. The airflow process inlet and reactivation outlet side including the high static blower, shown in FIG. 4 (not to scale)
Figure 6:
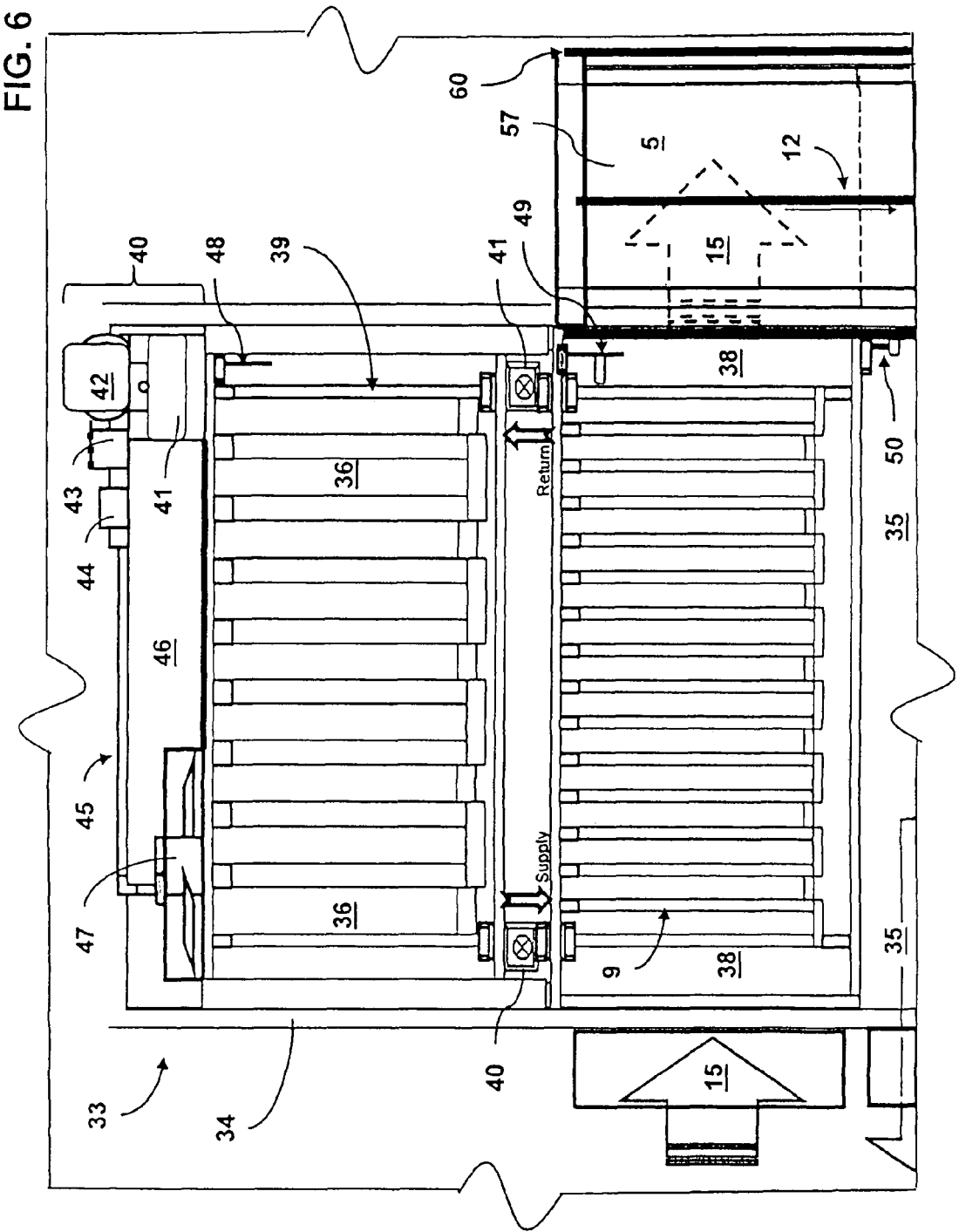
FIG. 6 is a schematic diagram sectional view of the inner construction of the closed-looped coils assemblies part of the Microwave Reactivation System. The microwave heating chamber coils assembly is connected to the reactivation section coils assembly shown also exposed in FIGS. 4, 5 and 7. Included are the major operational components such as; capacitor, diode, high voltage transformer, heater fluid circulation pumps, magnetron, stirrer blade and wave guide (not to scale)
Figure 9:
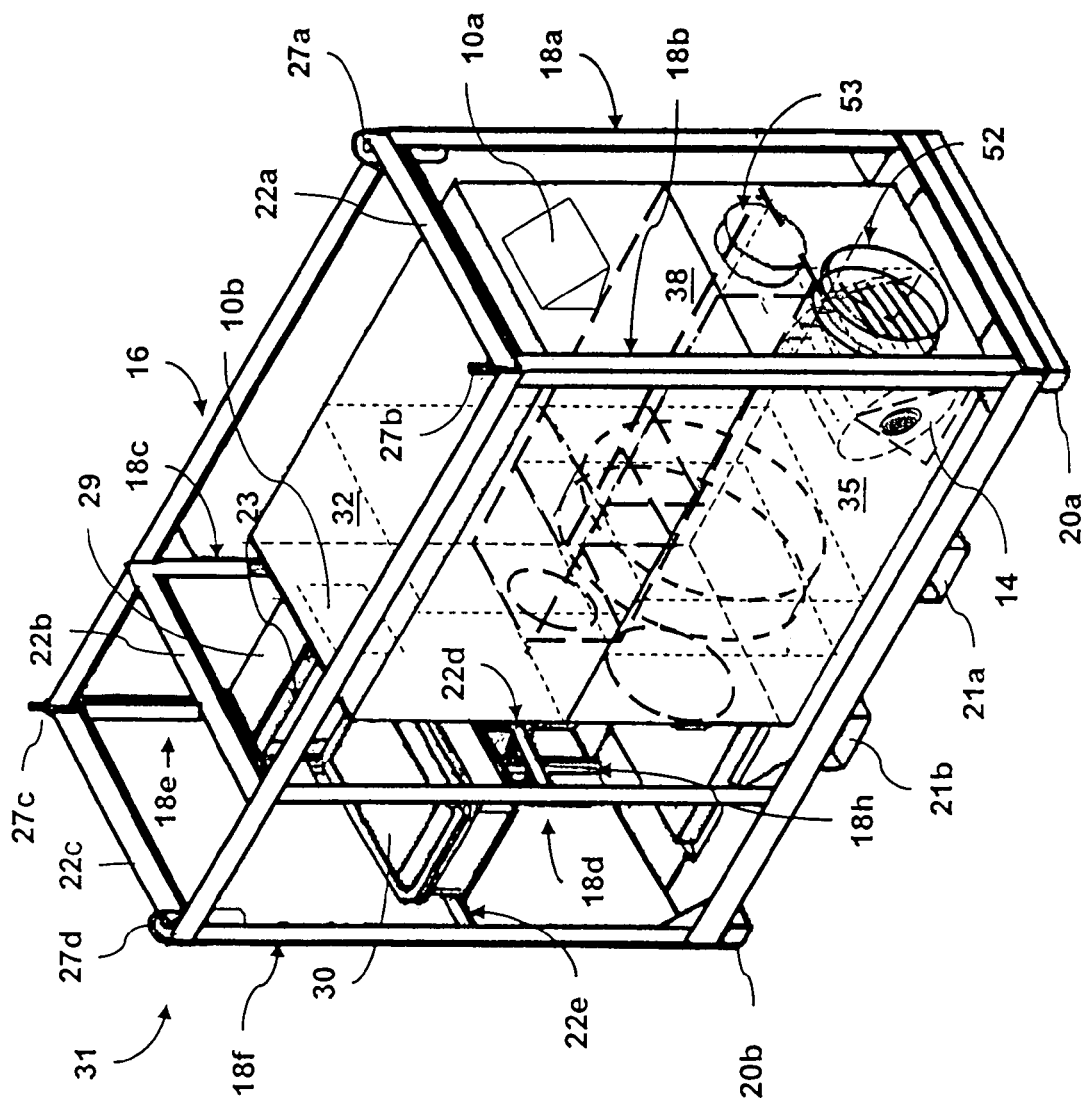
FIG. 9 is a schematic diagram sectional and perspective view shown in unit view 3 FIG. 1, which illustrates the cabinet's inner operational sections such as the process and microwave reactivation, including the desiccant rotor/wheel assembly compartment.
Figure 10:
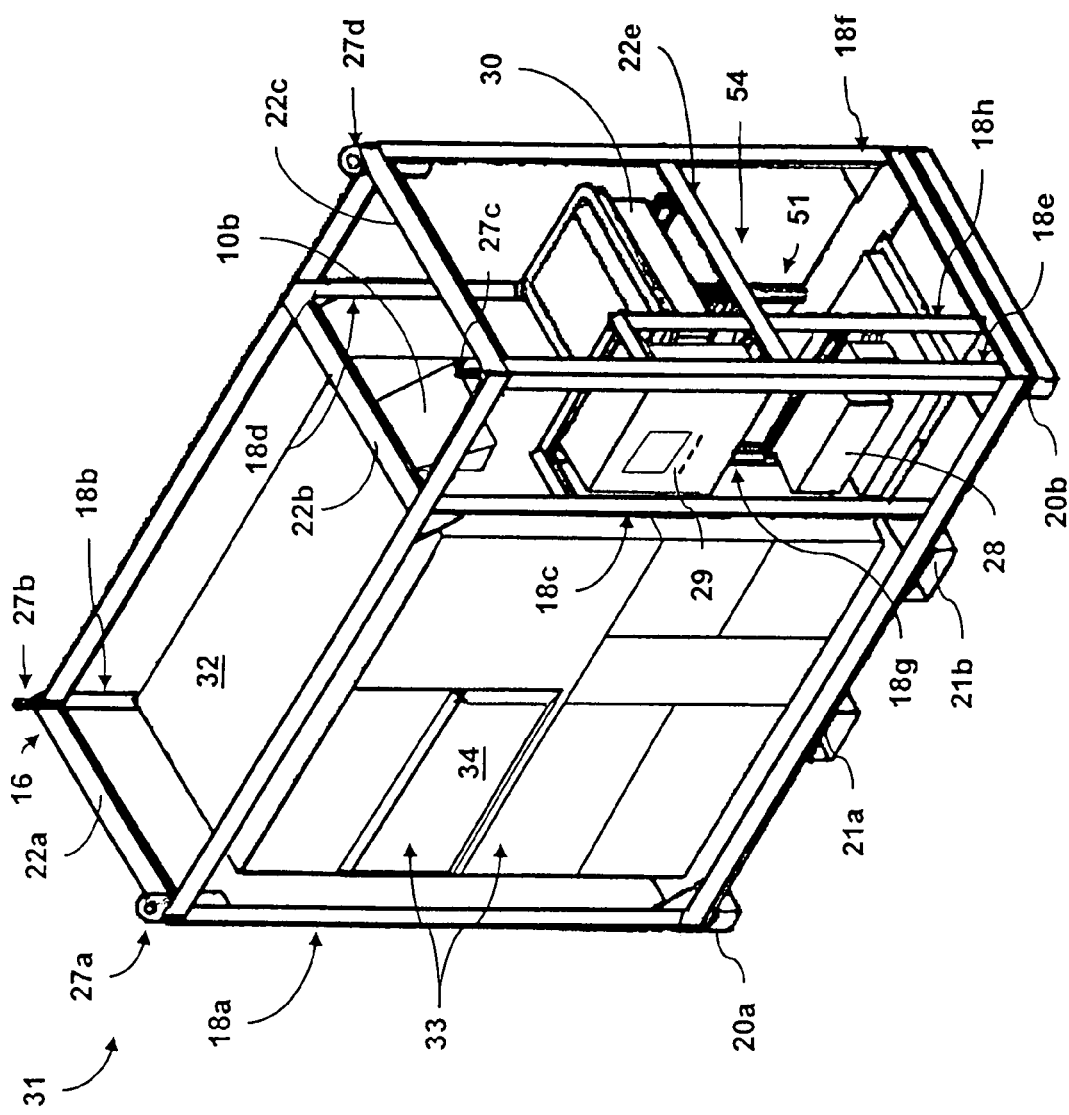
FIG. 10 is a schematic diagram perspective view shown in unit view 4 FIG. 1.

The process airflow 13 FIGS. 2 and 4 is drawn through the process section 35 FIGS. 2, 4, 6 and the perforated desiccant rotor/wheel assembly 5 core material 6 FIGS. 2, 4, 6, 7 by means of a high static suction blower and motor assembly 14 FIGS. 2, 4, 9 which draws through and propels the dry process airflow 13 and discharging it to the enclosed space or zone to be dehumidified and treated. The Microwave Reactivation System 33 FIGS. 4, 5, 6, 7 includes the microwave heating chamber 36 FIGS. 4, 5, 6, 7 which incorporates the glass ceramic coils assembly 39 and the reactivation section 38 which incorporates the reactivation metallic coils assembly 9. The Microwave Reactivation System 33 is used for heating of the reactivation airflow 15 FIGS. 2, 4, 6, 7 prior to it coming in contact with the desiccant core material 6 in the desiccant rotor/wheel assembly 5 FIGS. 2, 4, 6 and 7.

A second high static suction blower 8 FIGS. 2, 3, 4, 8 draws the reactivation airflow 15 which has been heated as it flows through the reactivation metallic coils assembly 9 and desiccant rotor/wheel assembly 5 perforated core material 6 FIGS. 2, 4, 6 and 7. This heated reactivation airflow 15 has a deactivating effect on the desiccant core material's 6 retention properties which enables the desiccant core material 6 to release the trapped moisture vapors into the reactivation airflow 15 FIGS. 2, 4, 6 and 7. This hot and moisture laden reactivation airflow 15 is drawn downstream and discharged outside into the ambient environment away from the dehumidified and treated space or enclosure.

A (PLC) programmable logistical controller panel 29 FIGS. 3, 4, 5, 8, 9, 10 is responsible for governing the various ongoing operations of the systems and components of the dehumidification system 31 and particularly the actuation of the Microwave Reactivation System 33 FIGS. 4, 5, 6, 7 which includes the thermal fluid (not shown), the circulation supply 40 and return 41 pumps FIGS. 4 and 6 and the microwave reactivation system high voltage part 40 components FIG. 6 such as; magnetron 41, HV transformer 42, capacitor 43, diode 44, electrical conduit 45, wave guide 46 and stirrer blades and motor assembly 47. The PLC controller panel 29 FIGS. 3, 4, 5, 8, 9, 10 also governs the reactivation 8 and process 14 blowers FIGS. 2 and 4, the desiccant rotor/wheel rotation motor & assembly 11 FIGS. 2, 4, 5, 8, and controls the operation of the dehumidification system 31. The PLC controller panel 29 is assisted by input received from various airflow and temperature sensors 48, 49, 50 FIG. 6 located in the microwave heating chamber 36, the reactivation section 38 down flow and aft of the metallic coils assembly 39 and the process section down flow and aft of the desiccant rotor/wheel assembly 5. The electrical box with bolted lid 30, the (PLC) programmable logistic controller 29 and plug-in power cable connector panel 28 FIGS. 3, 4, 5, 8, 9, 10 are housed in a generally square or rectangular design protective type enclosures. The PLC controller panel 29 has a hinged lid and screw type fasteners 50 FIGS. 3 and 4 and angles at various points for attachment and tight sealing of the lid. The electrical box 30, PLC controller panel 29 and the plug-in power cable connector panel 28 protective type enclosures can be designed as standard or explosion-proof rated enclosures.

In the preferred design, the electrical box 30, PLC controller panel 29 and plug-in power cable connector panel 28 protective enclosures are constructed of either stainless steel or of aluminum. Referring to FIGS. 2, 4 and 5, the desiccant rotor/wheel assembly 5 FIGS. 2, 4, 5, 6, 7, 8 is housed in a rectangular shaped cabinet 32 FIGS. 1, 3, 4, 5, 8, 9, 10 supported on cross members 20a, b FIGS. 1 and 3 of the unit frame 16.

In the preferred embodiment, the cabinet 32 FIGS. 1, 3 is constructed from stainless or from welded aluminum, coated with a durable resistant enamel or air-dry polyurethane corrosion resistant paint steel in order to resist corrosion. The cabinet 16 FIGS. 1, 3, 4, 5, 8, 9 and 10 includes top and bottom walls, front and rear spaced walls and opposed side walls as shown. As shown in unit view 2 FIG. 1 and FIGS. 5 and 8 adjacent the bottom wall, the front wall has the process inlet 51 and the reactivation outlet 54. The process inlet 51 is to allow airflow to pass into the process section 35 FIGS. 2 and 4 through the desiccant rotor/wheel assembly 5. Mounted at the process inlet 51 FIGS. 2, 3, 4 there could be installed an intake filter (not shown) for removing airborne contaminants or dust particles found in the ingested process airflow 13 prior to it entering the process section 35 and through the desiccant rotor/wheel assembly 5 and core material 6. The intake filter (not shown) installation in some applications tends to prevent the dust particles from accumulating within the process section 35 FIGS. 2 and 4 and clogging the desiccant rotor/wheel assembly 5 core material 6 channels 7 which will affect the performance of the desiccant rotor/wheel 5 and the overall operating dehumidification system 31 FIG. 1.

In the preferred embodiment, the intake filter (not shown) would be located at the process inlet 51 and is constructed as a metallic mesh filter which is washable and can be removed for cleaning and rinsing of dust and particles. As also shown in unit view 2 FIG. 1 and FIGS. 2, 4, 5, 8 the front wall also has a reactivation outlet 54 wet air discharge which permits the reactivation airflow 15 to flow through the desiccant rotor/wheel assembly 5 core material 6, out from the reactivation section 38 and expelled through the reactivation outlet 54 for the evacuation of the wet air discharge into the atmosphere. In an alternate embodiment, there could be installed in reactivation outlet 54 a manually operated damper assembly (not shown) including at least (1) one or more rotating louvers for selectively restricting the airflow out of the reactivation outlet 54. The use of this feature can increase the heat retention within the reactivation section 38 which will in turn increase the efficiency of the desiccant rotor/wheel assembly 5 core material 6 by accelerating the deactivation and drastically affecting the retention capabilities of the desiccant core material 6, which in turn speeds up the drying out of the desiccant core material 6 within the desiccant rotor/wheel assembly 5 as it rotates back into the process section 35 to resume its sorption (adsorption) operating cycle. In the preferred embodiment, there are (2) two explosion-proof rated high static suction blowers and motor assemblies; one is a forward curved blower with direct drive motor assembly 14 is located in the process section 35 and the other an axial type blower with direct drive motor assembly 8 is located in the reactivation section 38 FIGS. 2 and 4.

In both the process section 35 and the reactivation section 38 the blowers and direct drive motor assemblies housings 55 and 56 FIGS. 2 and 4 are secured within and to the cabinet 32 compartment bases, sides and upper walls by means of reinforced L and C shaped brackets and clamps (not shown) with bolt and nut assemblies (not shown). As viewed in FIGS. 2 and 4, the process outlet 52 allows for the discharge of the dry process airflow 13 which is drawn through the desiccant rotor/wheel assembly 5 core material 6 channels 7 in the process section 35 by the forward curved high static blower 14 driven by an electric direct drive motor (not shown) and through the process outlet 52 directly into the enclosure to be dehumidified. In an alternative embodiment, mounted in the process outlet 52 (dry air supply) there could be a manually operated damper assembly (not shown) including at least (1) one or more rotating louvers for selectively restricting the dry process airflow 13 out of the process outlet 52 (dry air supply) to increase the air pressure when required to the dehumidified area or enclosure. The second blower and motor assembly 8 FIGS. 2 and 4 is located in the reactivation section 38 outlet 54 and is a high static axial type blower with direct drive motor assembly 8 installed and secured within and to the cabinet 32 compartment. As viewed in FIGS. 2 and 4, this high static axial type blower 8 discharges out of the reactivation outlet 54 the hot moisture laden reactivation airflow 15 which is drawn into the reactivation intake, through the Microwave Reactivation System 33 heating coils assembly 9 and flowing through the perforated desiccant rotor/wheel assembly 5 core material 6. This high static suction blower 8 is driven by an electric direct drive motor (not shown).

In an alternative embodiment, mounted in the reactivation outlet 54 (wet air discharge) there could be a manually operated damper assembly (not shown) including at least (1) one or more rotating louvers for selectively restricting the airflow 15 out of the reactivation outlet 54. This restriction of the reactivation airflow 15 induces the temperature within the reactivation section 38 to rise, which has the effect of further deactivating the desiccant rotor/wheel 5 core material 6 retention capabilities. This restriction induces the core material 6 to release into the reactivation airflow 15 greater quantities and more rapidly its accumulated moisture. This damper assembly is only utilized as required. In the preferred embodiment, as viewed in FIGS. 2 and 4 both of the electric direct drive motors (not shown) used for driving the high static suction blowers 14 and 8 in the process 35 and reactivation 38 sections are completely enclosed and designed to be explosion-proof or intrinsically safe for use in hazardous environments. However it will be appreciated and understood that the electric direct drive motors which drive the process and reactivation section blowers 14 and 8 need not be electric motors.

In alternative embodiments, there may be installed either hydraulic, pneumatic or steam driven motors designed and approved with hazardous location classification, which could be utilized to accomplish the same task of driving the process section 35 high static suction blower 14 and reactivation section 38 high static suction blower 8. As shown in unit view 1 and 3 FIG. 1 and FIGS. 3, 4, 9 adjacent the bottom wall, the rear wall has the process outlet 52 and the reactivation inlet 53.

The process outlet 52 allows for the discharge of the dry process airflow 13 which is drawn through the desiccant rotor/wheel assembly 5 core material 6 in the process section 35 by the forward curved high static blower 14. This high static blower 14 is located at the process outlet 52 installed and secured firmly within the cabinet 32 compartment. The forward curved high static blower 14 is driven by an electric direct drive explosion-proof motor (not shown). The dry process airflow 13 is in turn discharged and propelled at high velocity through the process outlet 52 directly into the enclosure or area to be dehumidified and treated. As also shown in unit views 1 and 3 FIG. 1 and FIGS. 3, 4, 9 the rear wall also has a reactivation inlet 53 which permits the ambient air to flow into the reactivation section 38. In an alternate embodiment, mounted at the intake of the reactivation inlet 53 there could be installed an intake filter (not shown) for removing airborne contaminants or dust particles found in the incoming airflow entering the reactivation section. Installation of these intake filters in some applications tends to prevent the dust particles from accumulating within the reactivation 38 or process 35 sections FIGS. 2 and 4 eventually clogging the desiccant rotor/wheel assembly 5 core material 6 channels 7 which will affect the performance of the desiccant rotor/wheel 5 core material 6 and the overall operating system.

The type intake filters will now be explained in detail. In the preferred embodiment, there are installed two (2) industrial type metallic mesh filters (not shown) to avoid ingestion of dust particles and or foreign objects.

As shown in unit views 2 and 4 FIGS. 1, 3, 4, one of these filters (not shown) is located at the intake of the process inlet 51 and the other at the intake of the reactivation inlet 53. The filters (not shown) are constructed of metallic mesh which is washable and can be removed for cleaning and rinsing of dust and particles.

The invention; Microwave Reactivation System 33 for Standard and Explosion-Proof Dehumidification System will now be explained in greater detail. As viewed in FIGS. 2, 4, 6 and 7, the reactivation airflow 15 is drawn into the intake 53 of the reactivation section 38, flowing through the microwave reactivation system super heated metallic coils assembly 9. The reactivation airflow 15 air temperature is rapidly raised to a set point (approx. 200 to 250 degrees F.) prior to coming in contact with the desiccant rotor/wheel assembly 5 core material 6. The super heated reactivation airflow 15 passing through the desiccant core material 6 demagnetizes the core material 6 channels 7 which are impregnated with a desiccant coating. This high heat within the reactivation airflow 15 creates a deactivating effect on the retention properties of the core material 6 which in turn allows for in some cases greater release of moisture vapors/water droplets into the reactivation airflow 15 and discharged through the reactivation outlet 54 to ambient. Mounted in the reactivation outlet is a manually operated damper assembly (not shown) including at least (1) one or more rotating louvers for selectively restricting the air flow out of the reactivation outlet 54.

As previously mentioned, the use of this feature in some applications may be recommended in order to increase the heat retention within the reactivation section 38 which will in turn deactivate the retention capabilities of the desiccant core material 6 inducing a greater and more rapid release of moisture vapors embedded in the desiccant rotor/wheel assembly 5 core material 6.

Therefore, the inducing of increased temperature within the reactivation section 38, will in some operational cases promote a faster drying out of the desiccant core material 6 so that it can resume its moisture retention capabilities as it rotates back into the process section 35 also known as the sorption (adsorption) cycle. As viewed in unit views 1, 2, 3 FIG. 1 and FIGS. 3, 4, 5, 8 and 9, both of the process section inlet 51 and outlet ports 52 as well as the reactivation inlet 53 and outlet 54 ports are designed and adapted to receive flexible or rigid ducting for air recirculation and distribution. Given the enclosed tubular design, ducting is also used to maintain airflow pressure enabling the delivery and distribution of dry air to specific target areas to be dehumidified that are not in proximity to the dehumidification unit 31. As shown in FIG. 3 that the side wall has outer access panels 56a to 56i with latch assemblies (not shown) which lock and unlock to allow for easy access during servicing and maintenance. These panels 56a to 56h (except 56b) FIG. 4 enable quick access to all the dehumidification unit 31 operational systems and major components.

Figure 7:
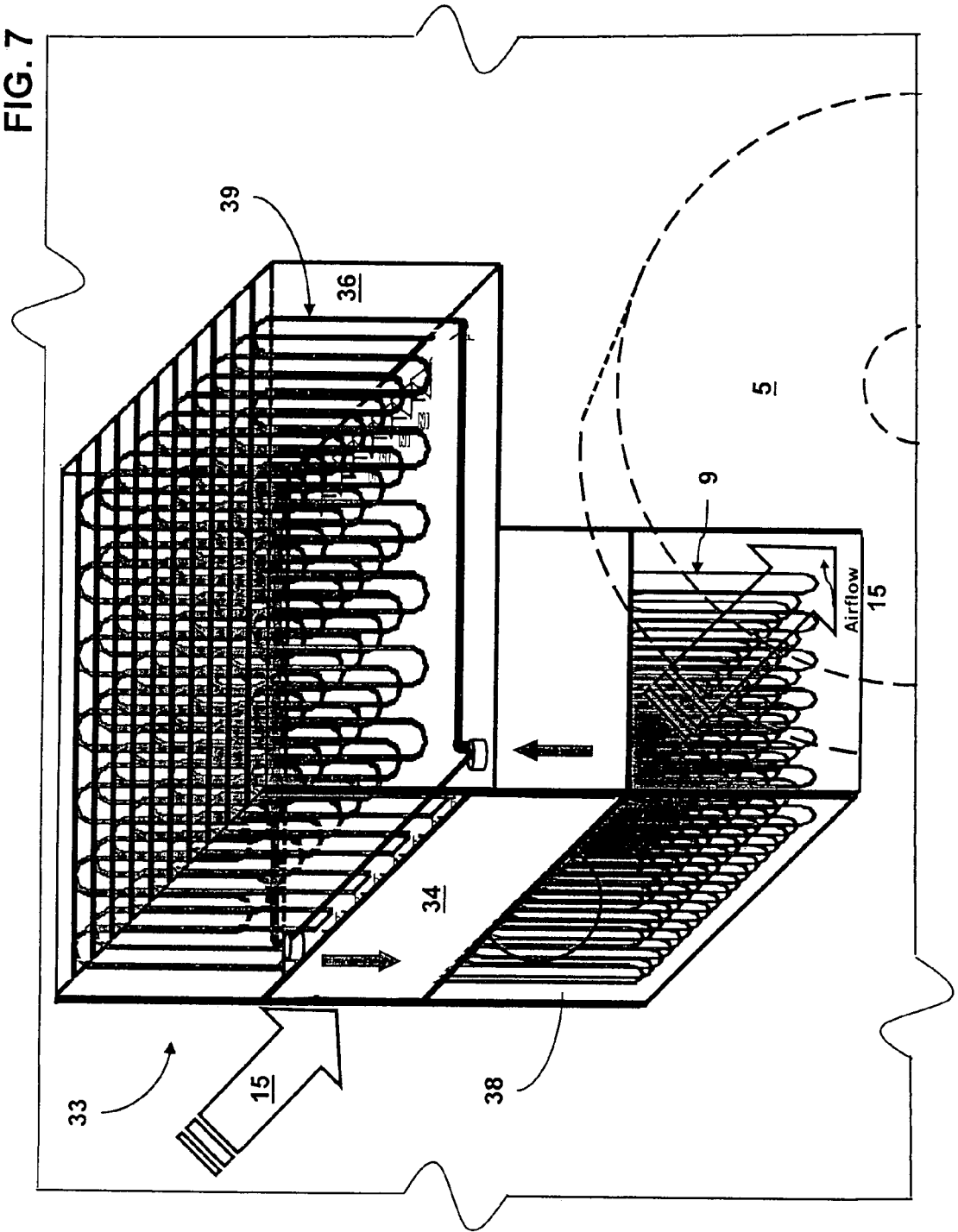
FIG. 7 is a schematic diagram with a perspective and sectional view of the Microwave Reactivation System as shown also in FIGS. 4, 5 and 6 (not to scale)
Figure 8:
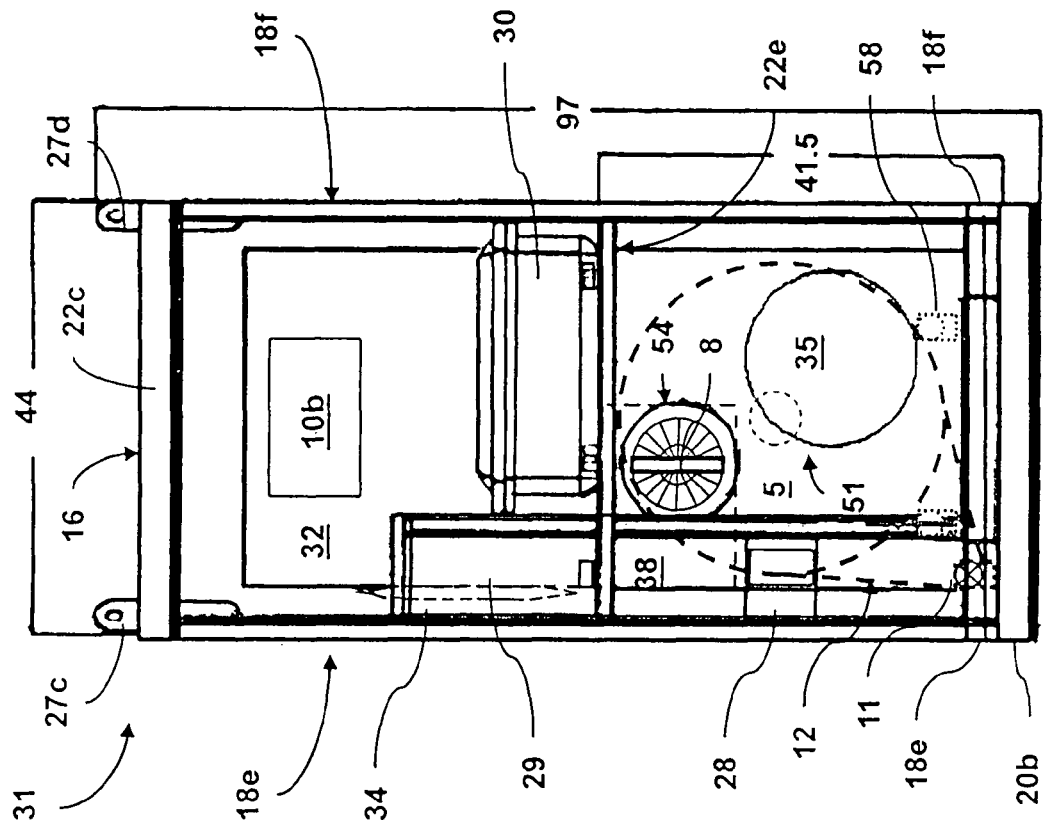
FIG. 8 is a schematic diagram elevation side view of the airflow process inlet and reactivation outlet including the high static reactivation discharge blower, shown in unit view 2 FIG. 1 and FIGS. 2, 4 and 5.

These operational components include; desiccant rotor/wheel assembly 5 and rotation motor assembly 11 FIGS. 2, 4, microwave reactivation system 33 FIGS. 4, 6, 7 which includes the high voltage part 40 and components 41 to 47, the microwave heating chamber 36 which houses the glass-ceramic coils assembly 39, the reactivation section 38 which incorporates the metallic coils assembly 9 and the supply and return thermal fluid circulation pumps 40 and 41. Other accessible components within the process 35 and reactivation 38 sections are the high static blowers with direct drive motor assemblies 8 and 14. All of these access panels 56a to 56h (except 56b) FIG. 4 may be designed and provided with a small window (not shown) in order to allow for visual inspection of the various components including more specifically the desiccant rotor/wheel assembly 5 and rotation motor assembly 11, the blowers and motor assemblies 8 and 14 and particularly the Microwave Reactivation System 33 and its various components. The other cabinet 32 side wall access panel 56b FIG. 4 allows for access to the compartment used during shipment of the dehumidification system's 31 for storage of the quick disconnect electrical supply cables (not shown) and flexible ducting sleeves (not shown) used for air distribution. With reference to the desiccant rotor/wheel assembly 5 FIGS. 2, 4, 5, 6 and 8 it is mounted upright and perpendicular to the base within the cabinet 32 accessed through panel 56f between two interior walls thereof as shown on FIG. 4 which are located fwd and aft of the desiccant rotor/wheel assembly 5. The desiccant rotor/wheel assembly 5 is supported on two (2) sets of roller bearings 58 FIGS. 2, 4, 5, 8 permanently affixed at the base at the 5 and 7 o'clock positions.

The desiccant rotor/wheel assembly 5 outer metallic shell 57 rests on these (2) two sets of roller bearings 58 providing not only support but allowing for rotational movement of the desiccant rotor/wheel assembly 5 about its longitudinal axis as it operates within the process section and reactivation section which incorporates the Microwave Reactivation System. 33.

In the preferred embodiment, there is an explosion-proof electric drive motor 11 FIGS. 2, 4, 5, 8, which provides for driving rotation of the desiccant rotor/wheel assembly 5 along its longitudinal axis. In the case where a standard non-explosion-proof motor is installed, in order to mitigate and avoid the hazard of explosion caused by sparking from brush contacts within the electric motor, the electric drive rotation motor 11 can also be encapsulated within a housing (not shown) classified with an explosion-proof rating. In an alternative embodiment and design adapted for some applications, the electric drive rotation motor 11 may include an internal ventilation fan for cooling the electric drive rotation motor 11. Alternatively, the electric drive rotation motor 11 may be designed and fitted with an air bleed/purging device (not shown). This air bleed/purging device can build up a positive pressure of air within the casing in order to decrease any build-up of flammable gases or volatile vapors and maintain conditions within tolerable and acceptable levels. This device prevents and avoids explosive volatile gases and vapor accumulation and expanding into the electrical sources which could cause high risk of sparking and igniting.

Though the preferred embodiment demonstrates the use of an electric drive rotation motor 11, it must be appreciated that in other alternative embodiments, the motor could be powered and driven pneumatically or hydraulically in order to perform the same function. As shown in FIGS. 2, 4, 5, 8 the electric drive rotation motor 11 is connected to the desiccant rotor/wheel assembly 5 by way of a gearbox (not shown) which in turn drives a self-tension drive belt 12 FIGS. 2, 4, 5, 6, 8. The gearbox (not shown) provides for drive rotation motor 11 speed to be reduced allowing for the specified desiccant rotor/wheel assembly 5 rotations to be achieved.

In the preferred embodiment, the desiccant rotor/wheel assembly 5 is driven to complete one full rotation every 8 to 10 minutes. The rotations could vary according to the diameter and thickness of the desiccant rotor/wheel assembly 5 as well as the specific applications and operational environment where it may be utilized. The electric drive rotation motor 11 is connected to a junction box (not shown) designed and rated explosion-proof. The electric drive rotation motor 11 is connected to the (PLC) programmable logic controller panel 29 FIGS. 3, 4, 5, 8, 10 rated explosion-proof for hazardous location, through an electrical conduit system (not shown) assembled within the dehumidification system frame 16 FIGS. 3, 4, 5, 8, 9, 10 for protection from the external environment and elements. This electrical conduit system (not shown) is internally comprised of electrical lines (not shown) which are encapsulated within the conduit in a sealed metal tubing (not shown) and connected to the junction box. (not shown).

In an alternative embodiment, it must be appreciated that the electrical conduit system which houses the electrical lines/wiring which are linked to the junction box may be designed and housed externally on the unit. As best demonstrated in FIGS. 2, 4, 6 the desiccant rotor/wheel assembly 5 includes an electrically conductive outer metallic shell or casing 57 and a monolithic core which is the desiccant core material 6. In the preferred embodiment, the outer casing or shell 57 is made of aluminum. However, it will be appreciated that in alternative embodiments, other type of electrically conductive alloys or metals could also be used in the fabrication of the desiccant rotor/wheel assembly 5 outer shell or casing 57. The core of the desiccant material 6 as shown in FIG. 2 is perforated and has a matrix made up of small uniformed tunnels or channels 7 with honeycomb, circular or square like shaped walls. These small uniformed channels 7 run parallel to the axis of the airflow (both the process 35 and reactivation 38). The desiccant core material 6 tunnel walls are constructed of a non-metallic, non-corrosive inert composite. The walls are made of extruded fiberglass paper fibers with an opening measuring at least 5 microns in diameter and are coated/impregnated with a solid desiccant type material which could preferably be, but is not limited to; silica gel, titanium silica gel, molecular sieve or lithium chloride, including other types of desiccant materials which can withstand repeated temperature fluctuations and moisture cycling. The desiccant material is evenly spread throughout the core 6 FIG. 2 of the desiccant rotor/wheel assembly 5.

When the desiccant core material 6 is cool and dry, it extracts the moisture from the airflow 13 (called sorption) because of its low vapor concentration and pressure in comparison to the incoming airflow which usually has a higher vapor concentration. Conversely, the desiccant core material 6 will release moisture as it is induced by the heated airflow 15 (called desorption) because under these conditions the desiccant material will tend to have a high vapor concentration and pressure which is released by the introduction of heat. The desiccant rotor/wheel assembly 5 FIGS. 2 and 4 is considered to be an active desiccant rotor/wheel because it performs its tasks of sorption and desorption by continuously rotating about its longitudinal axis, passing through the process 35 and reactivation 38 cycles and back for reuse in a perpetual process. This alternating cycle from high to low vapor pressures FIGS. 2 and 4 enables the sorption of moisture from the process airflow 35 and desorption, releasing moisture into the reactivation/regeneration airflow 38.

In the preferred embodiment, as shown on FIGS. 2, 4, 6 and 7 the desiccant dehumidification system 31 uses reactivation airflow 15 which is heated by the microwave reactivation system 33 metallic coils assembly 9 located within the reactivation section 38. This heated reactivation airflow 15 has a demagnetizing effect as it passes through the channels 7 of the desiccant core material 6 within the desiccant rotor/wheel assembly 5 which in turn releases the moisture back into the reactivation airflow 15 which is discharged to ambient.

Because the moisture removal in the desiccant rotor/wheel assembly 5 core material 6 occurs in the vapor phase, there is no liquid condensate. Therefore, the desiccant dehumidification system 31 can continue to extract moisture from the process airflow 13 even when the dewpoint of the process airflow 13 is below freezing. Consequently, in comparison to the conventional heating cooling hybrid or refrigerant based dehumidification systems, the desiccant dehumidification system 31 tends to be extremely more versatile in various climatic conditions and certainly better suited to operate in regions having cold and humid climates.

In the preferred embodiment, the desiccant rotor/wheel assembly 5 is installed and utilized within the standard or explosion-proof desiccant dehumidification system 31 and can be supplied by any approved desiccant rotor/wheel manufacturer which meets the industry standards and approved equipment specifications.

In the preferred embodiment, the portion of the core 6 of the desiccant rotor/wheel assembly 5 which is reactivated or regenerated FIG. 2 is sectioned off by a V-shaped partition member 59 FIG. 2 which is mounted in the cabinet 32 and which isolates and segregates a pie-shaped section approximately ¼ (one-quarter) of the desiccant rotor/wheel assembly 5 core material 6 from the remaining portion of the core 6 thereof, which defines the reactivation section 38 of the desiccant rotor/wheel assembly 5.

The remaining portion approximately ¾ (three-quarters) of the desiccant rotor/wheel assembly 5 core material 6 FIG. 2 defines the process section 35 of the desiccant rotor/wheel assembly 5. The reactivation portion of the desiccant rotor/wheel assembly 5 core material 6 may cover between one-quarter to one third of the surface core material 6 area of the desiccant rotor/wheel assembly 5. In the preferred embodiment, the reactivation portion of the desiccant rotor/wheel assembly 5 core material 6 covers one-quarter of the surface core area. As shown in FIGS. 2, 4, 5, 8, during the operation of the dehumidification system 31, the portions of the desiccant rotor/wheel assembly 5 core material 6 which define the process section 35 and the reactivation section 38 are constantly changing as a result of the rotation of the desiccant rotor/wheel assembly 5 by the electric drive rotation motor 11 which are linked by a rotation belt 12. Accordingly, as the portion of the desiccant rotor/wheel assembly 5 core material 6 that is exposed to the process airflow 13 defines the process section 35, likewise the portion of the desiccant rotor/wheel assembly 5 core material 6 that is exposed to the reactivation airflow 15 defines the reactivation section 38. Passing through three-quarters (75%) portion FIGS. 2, 4, 5, 8 of the desiccant rotor/wheel assembly 5 core material 6 surface, the process airflow 13 is drawn by means of a high static blower 14 FIGS. 2 and 4 into the process intake 51 through the process section 35 and propelled by the high static type blower 14 through the process outlet 52.

Simultaneously, the reactivation airflow 15 travelling in the direction opposite to that of the process airflow 13 is drawn into the reactivation intake 53 by means of a high static axial type blower 8 through a series of parallel super heated metallic coils assembly 9 part of the microwave reactivation system 33 within the reactivation section 38. The reactivation airflow 15 continues its path through the V-shaped one-quarter (25%) portion of the desiccant rotor/wheel assembly 5 core material 6 surface. The reactivation airflow 15 which is saturated with moisture vapors is then expelled by the high static axial type blower 8 and discharged through the reactivation outlet 54 to ambient. As shown in FIGS. 2, 4, 5, 8, it will thus be understood that as it rotates, the desiccant rotor/wheel assembly 5 processes two completely separate, counter-flowing or opposing airflows within its two sections; the process section 35 and the reactivation section 38. Two (2) pressure seals 60 FIGS. 2, 4, 6 mounted fore and aft of the desiccant rotor/wheel assembly 5 at the extremities of the outer shell rim and at the edges of V-shaped partition member 59 FIG. 2 are provided in order to separate and completely isolate the process airflow 13 from the reactivation airflow 15 and eliminate any possible air leakage or moisture crossover within the two operating sections located in the dehumidification system 31 cabinet 32.

In the preferred embodiment, the frame 16 FIGS. 1, 3, 4, 5, 8, 9, 10 will serve as ground, but it will be appreciated that in other embodiments, an alternative ground system including an electrical ground could be utilized.

With reference to FIGS. 4, 5, 6, and 7 the Microwave Reactivation System 33 will now be described in greater detail. The Microwave Reactivation System 33 can be installed in either a standard or explosion-proof rated desiccant dehumidification system 31.

In the preferred embodiment, the microwave heating chamber 36 part of the Microwave Reactivation System 33 is encapsulated in an explosion-proof type construction casing 34 including the microwave electrical and electronic high voltage part 40 components for use in hazardous locations and volatile environments.

This Microwave Reactivation System 33 FIGS. 4, 5, 6, 7 rapidly produces intense heat by generating electromagnetic RF waves which pass through materials and fluids, causing the molecules within to move rapidly in excitation, causing atomic motion which generates heat. In the preferred embodiment, the medium used to store and transmit this heat is a synthetic thermal fluid (not shown) located in the hollow coils assemblies 9 and 39 of the closed-loop circuit. As illustrated in FIGS. 2, 4, 6, 7 this thermal fluid is moved by means of supply 40 and return 41 pumps, flowing through a first parallel series of glass ceramic coils assembly 39 located in the microwave heating chamber 36 where the fluid molecules are treated and exposed to electromagnetic waves causing excitation, high temperature rise and heat generation within the fluid. This super heated thermal fluid (not shown) is then pumped and flows through a second parallel series of metallic coils assembly 9 located in the compartment below called the reactivation section 35 coming in direct contact and in the path of the reactivation airflow 15.

The heat transfer from the super heated thermal fluid (not shown) within the metallic coils assembly 9 in the reactivation section 38 substantially raises the temperature of the reactivation airflow 15 as it comes in contact and passes across the surface of the metallic coils assembly 9. This heated reactivation airflow 15 is then used to deactivate the perforated desiccant core material 6 within the desiccant rotor/wheel assembly 5 as it flows through it. This heated airflow has a demagnetizing effect on the desiccant core material 6 enabling it to release the retained accumulated moisture, exhausting it through the reactivation outlet 54 to ambient. This heat generating reactivation process 38 removes the moisture vapors from the desiccant core material 6 greatly lowering its moisture vapor concentration and pressure enabling the desiccant core material 6 to be re-energized for reuse in the air dehumidification process section 35. In an alternative embodiment and in the spirit of the invention, the microwave reactivation system 33 is designed and can be utilized as a heat generating system and also installed not only in desiccant dehumidification system 31 but also in any mechanical heating/cooling hybrid or refrigerant type dehumidification system (not shown) that must generate and incorporate a heat source in order to successfully accomplish the dehumidification process.

In the above mentioned types of dehumidification systems which are included, a heat source is required in order to raise the ambient intake airflow temperature, expanding the air volume and then allowing the refrigerant cooling coils to rapidly cool down the processed airflow as it passes through.

This enables the extraction of the suspended moisture vapors suspended within the airflow through condensation. Therefore, the Microwave Reactivation System 33 can also be a modular system that can be adapted to retrofit any conventional air treatment and conditioning, mechanical power or heat generating systems to provide a highly effective and cost efficient super heat generating source.

The Microwave Reactivation System 33 FIGS. 4, 5, 6, 7 power generation is divided into two parts, the control part 29 and the high-voltage part 40. In the preferred embodiment, the control part is actually comprised of the programmable logic controller also referred to as PLC panel 29 and of which the casing is explosion-proof in design. The PLC panel 29 controls and governs the power output and desired operational settings, monitors the various system functions, interlock protections and safety devices. Also in the preferred embodiment, the components in the high-voltage part 40 FIG. 6 are also explosion-proof rated and or encapsulated in an explosion-proof rated housing (not shown). Referring to FIG. 6, these components serve to step up the voltage to a much higher voltage which is then converted into microwave energy in the microwave heating chamber 36. Generally, the control part includes either an electromechanical relay or an electronic switch called a triac (not illustrated). Once the system is turned on, sensing that all systems are "go," the control circuit in the PLC controller panel 29 generates a signal that causes the relay or triac to activate, thereby producing a voltage path to the high-voltage transformer 42.

By adjusting the on-off ratio of this activation signal, the control part governs the flow of voltage to the high-voltage transformer 42 thereby controlling the on-off ratio of the magnetron tube 41 and the output power to the microwave heating chamber 36. In the high-voltage part 40 FIG. 6, the high-voltage transformer 41 along with a special diode 44 and capacitor 43 arrangement serve to increase the voltage to an extreme high voltage for the magnetron 41. The magnetron 41 dynamically converts the high voltage it receives into undulating waves of electromagnetic energy. This microwave energy is then transmitted into a metal rectangular channel identified as a waveguide 46 which directs the microwave energy or waves into the microwave heating chamber 36. The effective and even distribution of the electromagnetic energy or waves within the entire microwave heating chamber 36 is achieved by the revolving metal stirrer blades and motor assembly 47. In the preferred embodiment, FIGS. 6 and 7, high tensile and heat resistant glass ceramic hollow tubing capable of withstanding wide temperature variations is used in the construction of the glass ceramic coils assembly 39 located in the microwave heating chamber 36. The electromagnetic energy or waves produced by the magnetron 41 are dispersed by the metal stirrer blades and motor assembly 47 and come in contact with the entire glass ceramic coils assembly 39 located within the microwave heating chamber 36. The thermal fluid (not shown) flowing in these hollow coils is then simultaneously treated and exposed to this electromagnetic energy causing molecular excitation, atomic motion, high temperature rise between 250-300 degrees Fahrenheit and heat generation.

This super heated thermal fluid is simultaneously siphoned and propelled by means of a supply pump 40 flowing into and through the metallic coils assembly 9 located in the compartment below called the reactivation section 38.

In the preferred embodiment, as demonstrated in FIGS. 4, 5, 6, 7 the hollow tubing of the metallic coils assembly 9 located in the reactivation section 38 is constructed of steel, aluminum or other high tensile and heat resistant metal which is adaptable to extreme temperature variances and which can effectively retain and radiate heat. It is important to note that the diameter of the tubing of the metallic coils assembly 9 in the reactivation section 38 may be either smaller or of the same size in comparison to the diameter of the glass-ceramic coils assembly 39 in the microwave heating chamber 36. Also in the preferred embodiment, the distance between the coils of the metallic coils assembly 9 in the reactivation section 38 is narrower and the number of actual coils is 1.5 times greater but in an alternate design may be up to 2 times greater in number comparatively to the glass-ceramic coils assembly 39 located in the microwave heating chamber 36. This construction allows for a greater temperature rise and a more efficient heat transfer and distribution to the reactivation airflow 15 as it comes in contact passing across the surface and through the metallic coils assembly 9 in the reactivation section 38. As shown in FIGS. 6 and 7 the tightly spaced coil design of the metallic coils assembly 9 allows for a more effective and substantial heat transfer radiated from the heated thermal fluid onto the metal coils/tubing and radiated to the reactivation airflow 15.

A temperature rise of the reactivation airflow 15 of 170-200 degrees is achieved as it passes through the metallic coils assembly 9 in the reactivation section 38. This temperature rise in the reactivation airflow 15 and induction of high heat has an demagnetizing effect on the desiccant impregnated core material 6 within the desiccant rotor/wheel assembly 5. This super heated reactivation airflow 15 induces the desiccant impregnated core material 6 to rapidly release its retained accumulated moisture vapors back into the reactivation airflow 15 discharging through the reactivation outlet 54 to ambient and outside of the enclosure or area which is being dehumidified. The desiccant core material 6 is then ready for reuse, as the desiccant rotor/wheel assembly 5 rotates about it longitudinal axis and back into the air dehumidification process section 35. The heated thermal fluid (not shown) is simultaneously propelled and siphoned as it continues to transfer and radiate its heat as it flows through the metallic coils assembly 9 in the reactivation section 38. As viewed on FIGS. 4 and 6, the continuous and simultaneous siphoning and propelling of the heated thermal fluid (not shown) is duplicated by means of a second pump which is the return pump 41. This return pump 41 draws the thermal fluid back into the glass-ceramic coils assembly 39 in the microwave heating chamber 36 as part of a coils assemblies 9 and 39 closed-loop circuit. Therefore, in a perpetual cycle, the thermal fluid (not shown) undergoes repeated exposure to the microwave electromagnetic energy causing molecular excitation, atomic motion, high temperature rise between 250-300 degrees Fahrenheit and heat generation.

Consequently, the thermal fluid is the medium which moves back and forth passing through the microwave heating chamber 36 where it rapidly absorbs intense heat and onto the reactivation section 38 where it then releases this intense heat by dissipation and radiation as part of the Microwave Reactivation System 33. In the preferred embodiment, in FIG. 6, the thermal fluid circulation pumps 40 and 41 are of explosion-proof construction and rating, but alternate non-explosion-proof type can be installed. The modulation and cycling of the power to the high voltage part 40 is governed by the PLC controller panel 29 with data feed provided from temperature and airflow sensors located within the dehumidification system 31. As viewed on FIG. 6, there are two (2) temperature thermocouple type sensors 48 and 49, one located in the microwave heating chamber 36 and the other in the reactivation section 38. The temperature sensor 49 located in the reactivation section 38 has a secondary function which is that of an airflow sensor. A third sensor 50 functioning as an airflow sensor is located in the reactivation section 38. All sensors are mounted in place by a support bracket and interconnected by cable installed in a system of electrical metallic conduits (not shown) to the control part and circuit in the (PLC) programmable logic controller panel 29.

These sensors enable the detection of temperature and air pressure variations in the microwave heating chamber 36, the reactivation section 38 and the process section 35, then relay this information data to PLC controller panel 29 which in turn governs the high voltage part 40 to direct output power to the microwave heating chamber 36.

Consequently, in FIG. 6 the temperature thermocouple type sensor 48 located in the microwave heating chamber 36 ensures that the Microwave Reactivation System 33 operates and modulates as required in order to automatically generate the microwave energy needed to achieve and maintain the desired high temperature settings. These temperature settings within the microwave heating chamber 36 are required in order to ensure proper heat transfer to the thermal fluid as it flows through the coils assembly 39 in the microwave heating chamber 36 and into the coils assembly 9 in the reactivation section 38. This thermocouple type sensor 48 detects the temperature within the microwave heating chamber 36 as it is emitted off of the glass-ceramic coils assembly 39 which contains the heat thermal fluid. As shown in FIGS. 4, 5, 6, 7 this interaction between the temperature sensor 48 in the microwave heating chamber 36, the temperature and airflow sensor 49 in the reactivation section 38, the airflow sensor 50 in the process section 35 provide real time data/information to the PLC controller panel 29. In acquiring this information, the PLC controller panel 29 governs the high voltage part 40 part of the Microwave Reactivation System 33, ensuring that the specified reactivation airflow 15 temperature is achieved and maintained for an effective reactivation/regeneration of the desiccant rotor/wheel assembly 5 core material 6 within the air dehumidification system 31. In turn, the airflow pressure sensors 49 and 50 in both the reactivation section 38 and process section 35 ensure that proper airflow static pressure is consistently maintained. These sensors are also safety devices during operation which will identify and signal an alarm on the PLC controller panel 29 screen if there is a malfunction such as low reactivation temperature or drop in airflow pressure.

These sensors will also shut down the unit by signaling the control circuit in the PLC controller panel 29 in the case where the temperature exceeds the prescribed high temperature limit or when there is a substantial drop or loss of airflow through the system due to blockage of the inlet or outlet ports.

In the preferred embodiment, the electrical connections of these components to each other and the control part or PLC controller panel 29 is achieved by way of several electrical conduit systems (not shown) which are constructed and connected in part to the dehumidification system frame 16, yet accessible for maintenance and verification. In the preferred embodiment, all of the electrical conduits and wiring in the dehumidification system 31 are designed and rated for use in hazardous and volatile environments. It will be understood that in alternative embodiments, the Microwave Reactivation System 33 will incorporate design modifications which will allow for variations in performance capabilities. The modifications will determine size, output capacity and operational ranges in order to adapt to any dehumidification system 31 requirements whether it is a standard desiccant dehumidification, HVAC or explosion-proof dehumidification system.

The following is a resume of the operation of the Microwave Reactivation System 33 within a dehumidification system 31. As shown in FIGS. 2 and 4, upon deployment of the dehumidification system 31, the desiccant rotor/wheel assembly 5 is driven to rotate by means of a rotation motor 11 and belt assembly 12.

Consequently, both the process section 35 and reactivation section 38 high static blowers 8 and 14 are activated and operating. The process section 35 high static blower 14 draws through the process inlet 51 and filter (not shown) the airflow 13 from either the ambient air or from an enclosed space, defined in FIG. 2. As the process airflow 13 passes through the desiccant rotor/wheel assembly 5 core material 6 it is stripped of its moisture vapors which are retained by the inner channels 7 impregnated with a desiccant material which acts as a moisture magnet. The resultant is dry air which exits the desiccant rotor/wheel assembly 5 and is exhausted by means of a high static blower 14 from the process section 35 through the process outlet 52 into the enclosure or space that must be treated and humidity controlled. The process outlet 52 dry air supply high static blower 14 will maintain a recommended airflow static pressure for various flow rates (cubic feet per minute—CFM) of at least 2.5 to 3.0+ inches of water column (WC) to provide effective dry air distribution within the space or enclosure to be treated and dehumidified. This process section 35 dry airflow 13 supply has extremely low moisture content or greatly reduced to a predetermined or desired moisture level. Simultaneously, the reactivation section 38 high static blower 8 draws the reactivation airflow 15 from the ambient air and through the reactivation inlet 53 and filter (not shown) defined in FIG. 2.

In the preferred embodiment, the reactivation airflow 15 rate will be maintained at least 15 cubic meters per minute/530 cubic feet per minute. As the reactivation airflow 15 passes through the reactivation section 38 its temperature immediately increases as a result of an intense heat transfer radiated from the heated thermal fluid (not shown) within the metallic coils assembly 9 part of the Microwave Reactivation System 33. Though there could be acceptable variations in the reactivation airflow 15 temperature, the recommended operating temperature of the reactivation airflow 15 should reach between degrees; 120 C to 150 C/250 F to 300 F. Subsequently, the super heated reactivation airflow 15 flows through the desiccant rotor/wheel assembly 5 core material 6 which is saturated with moisture vapors.

This super heated reactivation airflow 15 serves to regenerate the "V" shaped section 59 of the desiccant rotor/wheel assembly 5 core material 6. The high heat has a demagnetizing effect on the inner channels 7 of the perforated desiccant core material 6 causing the desiccant core material 6 to release the moisture vapors back into the reactivation airflow 15 previously collected and retained within the desiccant rotor/wheel assembly 5 core material 6 from exposure to the process section 35 airflow 13. The moisture laden reactivation airflow 15 is then discharged by means of the high static blower 8 through the reactivation outlet 54 into ambient and away from the space or enclosure to be treated and dehumidified.

It is recommended to ensure that the reactivation section 38 discharge temperature leaving the reactivation outlet 54 does not exceed degrees; 50 C/122 F. During the rotation of the desiccant rotor/wheel assembly 5, prior to re-entering the process section 35, the desiccant core material 6 is cooled down in order to greatly reduce the vapor pressure of the desiccant core material 6, enhancing its tremendously effective adsorbing properties. The slow rotational speed of the desiccant rotor/wheel assembly 5; full rotation once every 8 to 10 minutes, is required to enable the cooling down of the desiccant core material 6.

Although the foregoing description and accompanying drawings relate to specific preferred embodiments of the present invention and specific methods of reactivation and heat generation for dehumidification systems as presently contemplated by the inventor, it will be understood that various modifications, changes and adaptations, may be made without departing in any way from the spirit of the invention.

The invention claimed is:

1. A system for dehumidifying air in an enclosed space or area comprised of desiccant rotor/wheel assembly having the following;
    a. a cabinet;
    b. a desiccant rotor/wheel assembly rotatively mounted within the casing or cabinet and having the core impregnated with a desiccant material and a metallic outer shell construction surrounding the desiccant core material, wherein the desiccant rotor/wheel assembly simultaneously rotates through a process section and a microwave reactivation section;
    c. means for driving the rotation of the desiccant rotor/wheel assembly within the cabinet;
    d. a first high static blower to provide means for drawing a supply airflow from the enclosed area or space and through the process section wherein moisture in the process inlet airflow is removed by the desiccant rotor/wheel assembly core material;
    e. a process dry air outlet located downstream of the process section is utilized for discharging dry air supply from the desiccant rotor/wheel assembly into the enclosed space or area to be treated, dehumidified and controlled;
    f. a the microwave reactivation section including a microwave heating chamber which is enclosed in an explosion-proof casing or cabinet including explosion-proof rated system components for purpose of raising the temperature of a thermal fluid within coils assemblies which come in contact and heating incoming reactivation airflow;
    g. a second high static blower to provide means for drawing in the incoming reactivation airflow from outside the enclosed space or area and siphoning it through the reactivation section to heat the airflow into a superheated reactivation airflow, urging the reactivation airflow through the reactivation heating coils assembly part of the microwave reactivation section and through the desiccant rotor/wheel assembly core material;
    h. wherein the super heated reactivation airflow has a demagnetizing effect which deactivates the desiccant core material, wherein the moisture retained within the desiccant core material is immediately released into the reactivation airflow to create a reactivation hot wet airflow discharge;
    i. a reactivation air outlet which is located downstream of the reactivation section, exhausts the reactivation hot wet airflow discharge externally into ambient atmosphere outside of the enclosed space or area which is being treated and dehumidified.

2. The system of claim 1, further comprising a frame for supporting the unit cabinet and serving also as a ground.

3. The system of claim 1, wherein the means for driving rotation includes an electric drive motor assembly whether standard or explosion-proof rated.

4. The system of claim 3, wherein the motor is one of the following:
    a. electrically driven motor
    b. pneumatically driven motor
    c. hydraulically driven motor.

5. The system of claim 1, wherein each of the first and second high static blowers located in the process and reactivation sections are each individually directly driven by a motor whether standard or explosion-proof rated.

6. The system of claim 5, wherein the blowers motor is one of the following:
    a. electrically driven motor
    b. pneumatically driven motor
    c. hydraulically driven motor.

7. The system of claim 1, wherein the microwave reactivation section is responsible for heating the reactivation airflow using electrical energy as the power source generated from various groups consisting of;
    a. standard electrical main/power grid energy
    b. electromechanical/electromagnetic-power generator energy
    c. photovoltaic-solar power energy
    d. wind power energy
    e. electrochemical-battery/fuel cell energy.

8. The system of claim 1, wherein the microwave reactivation section includes at least two interconnected coils assemblies as part of a closed-loop system wherein one coil assembly located in the microwave heating chamber and the other in the reactivation section, each filled with a heating thermal fluid which is pumped flowing continuously through the closed-loop coils assemblies.

* * * * *